United States Patent
Wickham et al.

(10) Patent No.: US 6,307,546 B1
(45) Date of Patent: Oct. 23, 2001

(54) TELECOMMUNICATIONS SYSTEM CRAFT INTERFACE DEVICE WITH PARSER HAVING OBJECT-ORIENTED STATE MACHINE

(75) Inventors: Gregory Wickham, Petaluma; Linda Ranney, Rohnert Park; Peter Thompson, Calistoga, all of CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/000,664

(22) Filed: Dec. 30, 1997

(51) Int. Cl.[7] ............................... H04L 12/56; G06F 3/00
(52) U.S. Cl. ...................... 345/349; 345/339; 345/969; 709/223; 709/224
(58) Field of Search .................................... 709/302, 232, 709/224, 223; 345/341, 342, 340, 969, 339, 349

(56) References Cited

U.S. PATENT DOCUMENTS

| | | | |
|---|---|---|---|
| 4,833,592 | 5/1989 | Yamanaka | 364/138 |
| 4,942,540 | 7/1990 | Black et al. | 709/228 |
| 5,021,968 | * 6/1991 | Ferketic | 345/969 |
| 5,049,873 | 9/1991 | Robins et al. | 340/825.06 |
| 5,175,800 | 12/1992 | Galis et al. | 706/45 |
| 5,295,244 | * 3/1994 | Dev et al. | 345/357 |
| 5,436,890 | 7/1995 | Read et al. | 370/352 |
| 5,629,978 | 5/1997 | Blumhardt | 370/271 |
| 5,684,947 | 11/1997 | Horie | 714/37 |
| 5,687,315 | * 11/1997 | Tezuka et al. | 345/969 |
| 5,761,429 | 6/1998 | Thompson | 709/224 |
| 5,793,974 | 8/1998 | Messinger | 709/224 |
| 5,794,006 | 8/1998 | Sanderman | 709/223 |
| 5,802,530 | 9/1998 | Van Hoff | 707/513 |
| 5,809,286 | 9/1998 | McLain et al. | 395/500.44 |
| 5,867,689 | 2/1999 | McLain et al. | 395/500.44 |
| 5,878,411 | 3/1999 | Burroughs et al. | 707/4 |
| 5,881,059 | 3/1999 | Deschaine | 370/337 |
| 5,910,803 | * 6/1999 | Grau et al. | 345/357 |

(List continued on next page.)

OTHER PUBLICATIONS

William Stallings, "Data and Computer Communtations, 4th Ed", pp. 175–179 and 273–279, 1994.*
"Object–Oriented State Machines," by Ted Faison, *Software Development* Magazine, Sep. 1993.

Primary Examiner—Raymond J. Bayerl
Assistant Examiner—Thomas J Joseph
(74) Attorney, Agent, or Firm—Jackson Walker, LLP

(57) ABSTRACT

A craft interface device for accessing, maintaining and provisioning a telecommunications network includes a graphical user interface, a domain modeling framework, and a communications framework which includes a parser. The graphical user interface is operatively connected to a monitor for displaying thereon structural components of the telecommunications network and for indicating, on the monitor, operating relationships among the structural components. The domain modeling framework is operatively connected to the graphical user interface for supplying thereto descriptions of the objects to be displayed. The communications framework is operatively connected to the domain modeling framework for generating and transmitting, in response to user commands detected by the graphical user interface, data requests over a data link of the network and for reading data lines arriving from the network. The parser includes an object-oriented state machine operatively connected to the communications framework for parsing information from an incoming sequence of data lines or events. The parser, via the domain model, is operatively connected to the graphical user interface for providing information thereto for display. The state machine includes a current state object taken from a group of different possible state objects each transformable into at least one of the other state objects in response to an incoming message of a given type.

19 Claims, 14 Drawing Sheets

U.S. PATENT DOCUMENTS

| | | | |
|---|---|---|---|
| 5,935,209 | 8/1999 | Budhraja et al. | 709/223 |
| 5,936,622 * | 8/1999 | Halverson et al. | 345/339 |
| 5,950,204 * | 9/1999 | Ikeda | 707/102 |
| 5,958,012 | 9/1999 | Battat et al. | 709/224 |
| 6,008,814 | 12/1999 | Baldwin et al. | 345/427 |
| 6,115,393 * | 9/2000 | Engel et al. | 370/469 |
| 6,145,001 * | 11/2000 | Scholl et al. | 709/223 |
| 6,225,999 * | 5/2001 | Jain et al. | 345/356 |

* cited by examiner

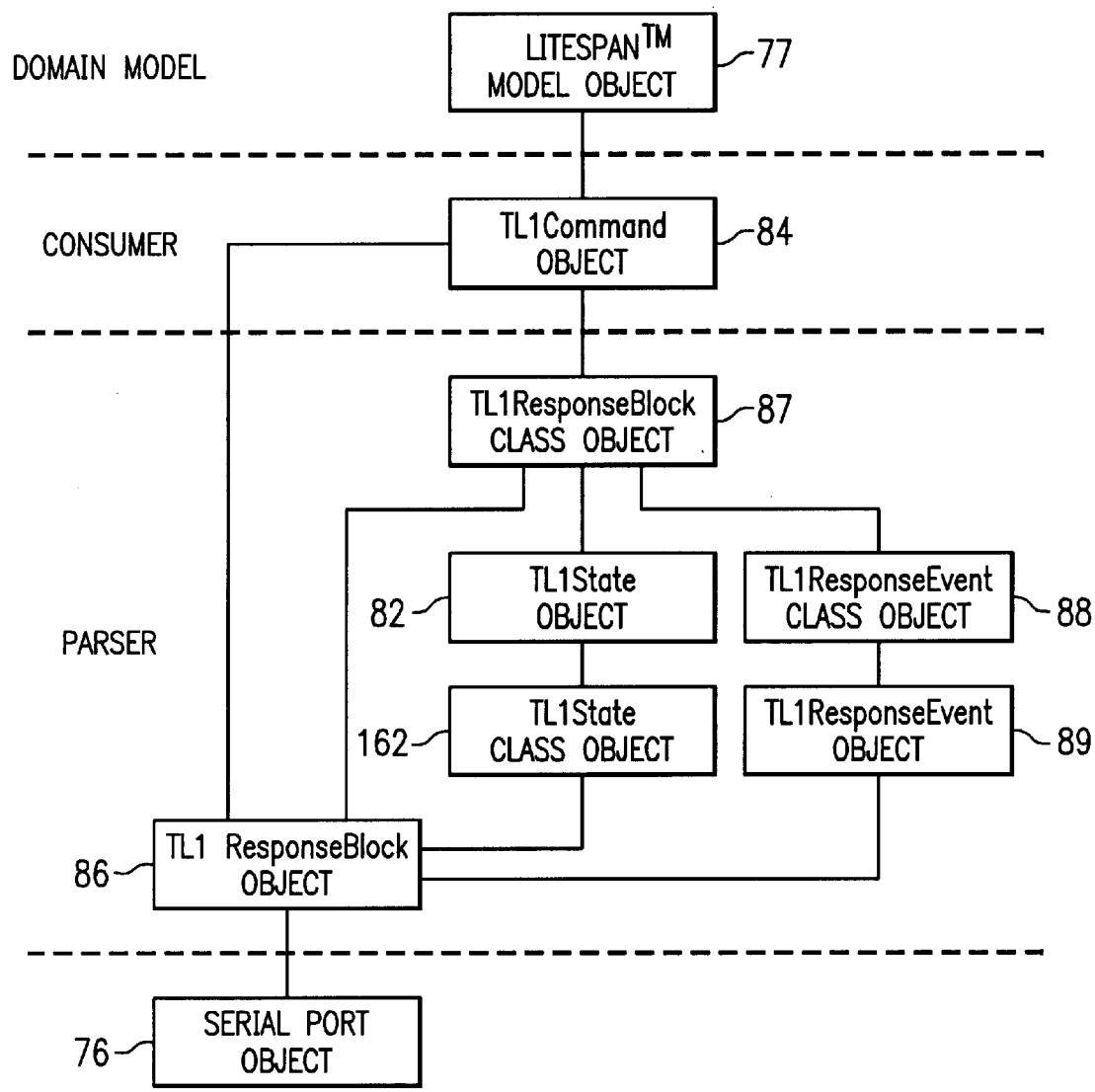

TO FIG. 10B

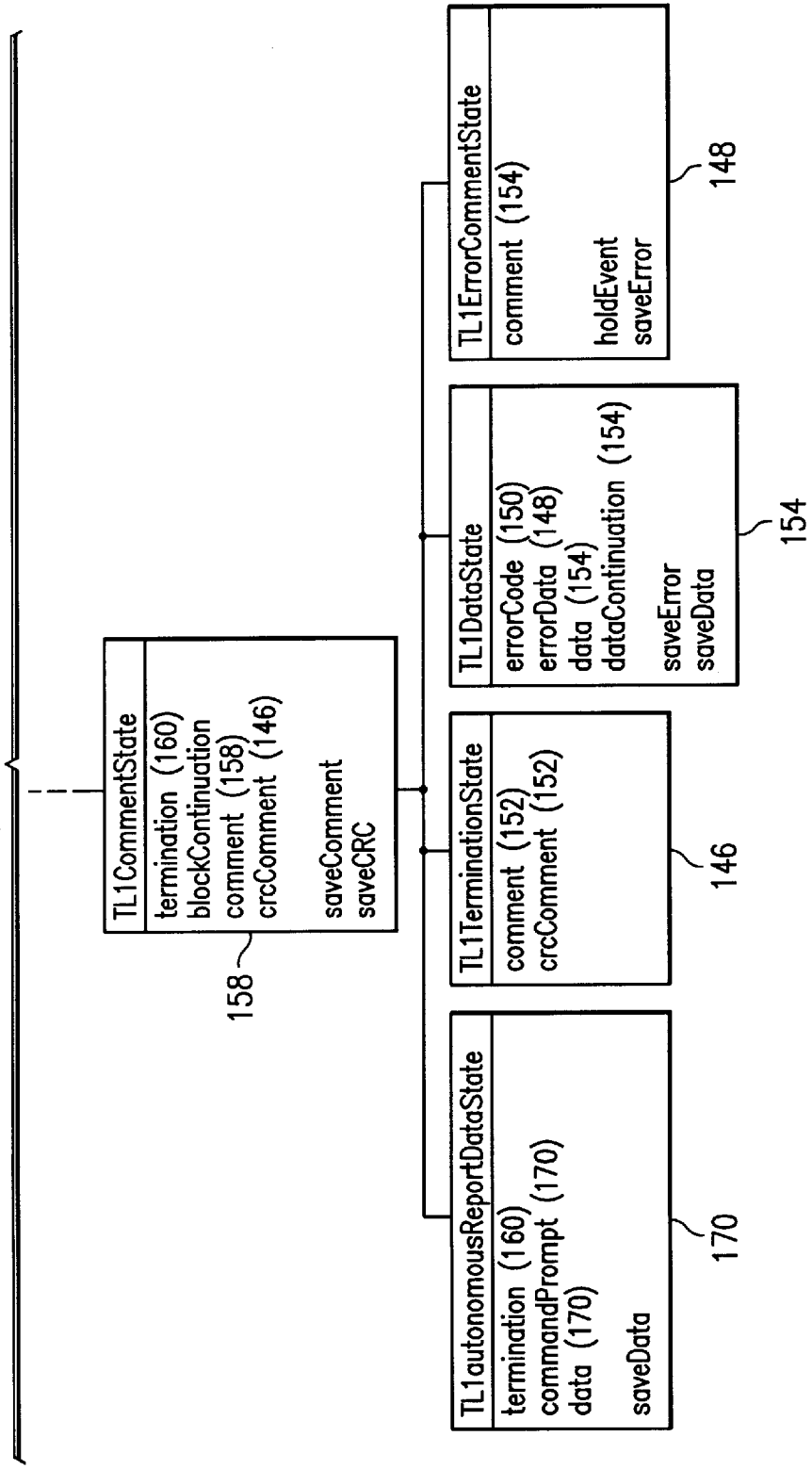

FIG. 14A

| \ STASTES<br>EVENTS\(WAIT FOR) | TL1Header (142) | TL1TermReport (144) | TL1Data (154) | TL1ErrorComment (148) |
|---|---|---|---|---|
| #header | saveHeader=>(144) | error=>(166) | error=>(166) | error=>(166) |
| #terminationReport | error=>(152) | saveCtag=> ?<br>holdEvent=> | error=>(152) | error=>(152) |
| #termination | error=>(152) | error=>(152) | noop=>(160) | error=>(160) |
| #blockContinuation | error=>(152) | error=>(152) | noop=>(160) | holdEvent=>(160) |
| #commandPrompt | saveCommand=>(142) | error=>(152) | error=>(152) | error=>(152) |
| #errorCode | error=>(152) | error=>(152) | saveError=>(150) | error=>(152) |
| #errorData | error=>(152) | error=>(152) | saveError=>(148) | error=>(152) |
| #data | error=>(152) | error=>(152) | saveData=>(154) | error=>(152) |
| #dataContinuation | error=>(152) | error=>(152) | saveData=>(154) | error=>(152) |
| #comment | error=>(152) | error=>(152) | saveComment=>(158) | saveError=>(154) |
| #blankLine | noop=>(142) | noop=>(154) | noop=>(154) | noop=>(148) |
| #unidentified | error=>(152) | error=>(152) | error=>(152) | error=>(152) |
| #crc Comment | error=>(152) | error=>(152) | saveCRC=>(146) | holdEvent=>(146) |
| #inProgress | saveCommand=>(160) | error=>(152) | error=>(152) | error=>(152) |
| #reset ** | reset=>(164) | reset=>(164) | reset=>(164) | reset=>(164) |
| | | | | |
| #commandString | error=>(152) | error=>(152) | error=>(152) | error=>(152) |
| #autonomousMsg | error=>(152) | error=>(152) | error=>(152) | error=>(152) |

| TL1ErrorData (150) | TL1Comment (158) | TL1EventError (152) | TL1Final (160) | TL1Termination (146) |
|---|---|---|---|---|
| error=>(166) | error=>(166) | error=>(166) | saveHeader=>(144) | error=>(166) |
| error=>(152) | error=>(152) | error=>(152) | error=>(152) | error=>(152) |
| error=>(152) | noop=>(160) | error=>(152) | error=>(152) | noop=>(160) |
| error=>(152) | noop=>(160) | error=>(152) | error=>(152) | noop=>(160) |
| error=>(152) | error=>(152) | noop=>(142) | saveCommand=>(142) | error=>(152) |
| error=>(152) | error=>(152) | error=>(152) | error=>(152) | error=>(152) |
| error=>(152) | error=>(152) | error=>(152) | error=>(152) | error=>(152) |
| saveError=>(148) | error=>(152) | error=>(152) | error=>(152) | error=>(152) |
| error=>(152) | error=>(152) | error=>(152) | error=>(152) | error=>(152) |
| error=>(152) | saveComment=>(158) | error=>(152) | error=>(152) | error=>(152) |
| noop=>(150) | noop=>(158) | noop=>(152) | noop=>(160) | noop=>(146) |
| error=>(152) | error=>(152) | error=>(152) | error=>(152) | error=>(152) |
| error=>(152) | saveCRC=>(146) | error=>(152) | error=>(152) | error=>(152) |
| error=>(152) | error=>(152) | error=>(152) | error=>(152) | error=>(152) |
| reset=>(164) | reset=>(164) | reset=>(164) | reset=>(164) | reset=>(164) |
|  |  |  |  |  |
| error=>(152) | error=>(152) | error=>(152) | error=>(152) | error=>(152) |
| error=>(152) | error=>(152) | error=>(152) | error=>(152) | error=>(152) |

FROM FIG. 14A

| TL1PromptSync (164) | TL1CommandEcho | TL1AutonomousReport (166) | TL1AutonomousReportData (170) |
|---|---|---|---|
| noop=>(164) | error=>(152) | error=>(152) | error=>(152) |
| noop=>(164) | error=>(152) | ?holdEvent=>(154) | error=>(152) |
| noop=>(164) | error=>(152) | error=>(152) | noop=>(160) |
| noop=>(164) | error=>(152) | error=>(152) | noop=>(160) |
| saveCommand=>(142) | saveCommand=>(164) | error=>(152) | saveCommand=>(170) |
| noop=>(164) | error=>(152) | error=>(152) | error=>(152) |
| noop=>(164) | error=>(152) | error=>(152) | error=>(152) |
| noop=>(164) | error=>(152) | error=>(152) | saveData=>(170) |
| noop=>(164) | error=>(152) | error=>(152) | saveData=>(170) |
| noop=>(164) | error=>(152) | error=>(152) | error=>(152) |
| noop=>(164) | noop=> | noop=>(166) | noop=>(170) |
| noop=>(164) | error=>(152) | error=>(152) | error=>(152) |
| noop=>(164) | error=>(152) | error=>(152) | error=>(152) |
| error=>(152) | error=>(152) | error=>(152) | error=>(152) |
| noop=>(164) | reset=>(164) | reset=>(164) | reset=>(164) |
|  |  |  |  |
| =>(142) | =>(142) | error=>(152) | error=>(152) |
| error=>(152) | error=>(152) | =>(170) | error=>(152) |

FROM FIG. 14B

TELECOMMUNICATIONS SYSTEM CRAFT INTERFACE DEVICE WITH PARSER HAVING OBJECT-ORIENTED STATE MACHINE

BACKGROUND OF THE INVENTION

This invention relates to a craft interface device for executing maintenance and provisioning operations in a telecommunications system. This also invention relates to an associated method.

A Litespan™ -type telecommunications system is a group of one or more Litespan™ terminals connected together, for example, in a chain configuration by optical fiber. Each Litespan™ terminal comprises a rack or other enclosure with multiple banks each having a printed circuit board "backplane." These printed circuit boards each have a plurality, e.g., sixty-five, of numerically ordered slots in which various cards, such as fiber cards and subscriber line cards, are vertically disposed.

Each Litespan™ terminal includes a common control (CC) bank and a number of subscriber banks (fiber banks, channel bahks) for various kinds of fiber connections and various kinds of subscriber drops such as POTS, ISDN, HFC, etc. A fiber bank includes one backplane, power supplies, plug-in bank control units and fiber cards. A channel bank includes a single backplane, power supplies, plug-in bank control units and subscriber line cards. Each remote terminal (RT) access multiplexer communicates on one or both sides with a fiber span and may also include various types of subscriber drops. A local telephone company can begin operations with rack shelves only partially filled with backplanes and with the backplane slots only partially occupied and fill in the remaining backplanes and slots as the number of subscribers and service requirements increase.

In a Central Office (CO) of a telephone company, one terminal, called the Central Office Terminal (COT), has an interface to a digital cross-connect switch (DCS) and communicates with the chain of remote terminals (RT's) through one or two fiber spans. The remote terminals are typically located at geographically diverse locations in order to bring telecommunications service to different service areas.

Terminals can also include Broadband Fiber Banks (BFB's) which connect on one side to the terminal's common control and on another side to a number ot distribution fibers. The distribution fibers connect to fuirther optical network units (ONU's) such as a so-called "brick," a Broadband Remote Transceiver (BRX), or a VEX. These ONU's take fiber on one side and on the other side provide narrow-band and broadband services over copper to a number of subscribers.

In order to perform maintenance and provisioning operations on the Litespan™ system, a craftsperson may use a Litecraft™ product, which is a PC-based product which can be plugged into a COT or RT. Upon connection of a Litecraft™ to a system terminal, for (example, via a serial port of the PC and a data link the, Litecraft™ product downloads configuration information from the system using a standard telephony communication language, TL-1, and presents the configuration information graphically to the user, beginning with a top-level diagram of the overall system. This top-level diagram shows a configuration of terminals and their operational relationships or connections to each other. When the user clicks on a component of the system, the Litecraft™ product retrieves information about that component and presents the retrieved infonnation graphically to the user. This presentation is a number of levels deep, enabling the user first to see the overall system, then to see components in an individual terminal, then to see individual access multiplexers within a terminal, then to see individual cards within an access multiplexer. Moreover the user can open multiple windows and browse through the entire system independently in each such window.

In order to perform its various tasks, a Litecraft™ product must download extensive configuration information about the system to which it is connected. Such downloading is usually implemented via TL-1 across a serial communications link. The information is obtained from various terminals in the system.

It is necessary for the Litecraft™ craft interface device to parse the incoming TL-1 data blocks which contain the system information. Parsing of any language is!generally accomplished using software state machines, or "finite state automata." In the article "Object Oriented State Machines," Software Development Magazine, September, 1993, Ted Faison discusses generally a way to construct finite state automata using "state objects" to represent various parsing states.

Objects of the Invention

An object of the present invention is to provide an improved maintenance and provisioning device for a telecommunications system and/or an improved method for accessing a telecommunications system for maintenance and provisioning purposes.

Another, more particular, object of the present invention is to provide such a telecommunications system maintenance and provisioning device and/or method wherein the handling of autonomous notifications or reports is facilitated.

A further object of the present invention is to provide a telecommunications system maintenance and provisioning device and/or method wherein error recovery is facilitated.

These and other objects of the invention will be apparent from the drawings and descriptions provided hereinafter.

SUMMARY OF THE INVENTION

The present invention is directed generally to a craft interface device for accessing, maintaining and provisioning a telecommunications network. The craft interface device has a parser which includes an object-oriented state machine. The object oriented state machine includes a current state object whose state is one of a plurality of different possible states some of different classes. More specifically, a craf interface device for maintaining and provisioning operations in a telecommunications network comprises, in accord nce with the present invention, a graphical user interface, a domain modeling framework, and a communications framework which includes a parser. The graphical user interface is operatively connected to a monitor for displaying thereon structural components of the telecommunications network and for indicating, on the monitor, operating relationships among the structural components. The domain modeling framework is operatively connected to the graphical user interface for supplying thereto descriptions of the objects to be displayed. The communications framework is operatively connected to the domain modeling framework for generating and transmitting, in response to user commands detected by the graphical user interface, data requests over a data link of the network and for reading data lines arriving from the network. The parser includes an object-oriented state machine operatively connected to the communications framework for parsing information from an incoming sequence of data lines or events, The parser, via the domain model, is operatively connected to the graphical user interface for providing information thereto for display, The state machine includes a current state object taken from a group of diflfrent possible state objects each transformable into at least one of the other state objects in resporse to an incoming message of a given type.

The parser also includes a lexer and a response block object. The lexer, a class object, generates symbols in response to incoming data lines or events. More specifically, the lexer retrieves a line (event) of an incoming data block, categorizes the line, and sends the information to the current state object. The current state object is operatively coupled to the response block object for storing, in the response block object, information extracted from the data lines or events.

In accordance with a special feature of the present invention, the parser can generate and incorporate multiple response block objects holding information from respective data responses or autonomous reports. Earlier generated response block objects have pointers which identify subsequently generated response block objects and thereby establish a hierarchical tree structure. In accordance with the tree structure, earlier response block objects await the completion, closure or population of subsequent response block objects. The first response block object is generally created to store data requested at the behest of a user. This data is transmitted over the data link in response to a command generated by the communications framework. A second, subsequently generated, response block object stores data pertaining to an autonomous notification received by the parser from the network. The first response block includes a pointer to the second response block preventing delivery of the first response block to the graphical user interface until the second response block is fully populated.

The craft interface device also composes a port object wkich is responsive to messages for writing characters for transmission over a data link of the network and for reading characters arriving from the network. The port object may be viewed as pait of the communications framework or separately. In either case, the communications frainework transmits data requests over the data link via the port object and receives data blocks from the network via the port object.

The current state object represents the current state of the parser. The current state object receives, from the lexer, a symbol corresponding to a respective one of the data lines or events. The current state object thereupon replaces itself with a new state object representing a new current state of the parser and extracts information from the respective data line or event for storage in the relevant response block object.

The driver, a class object, holds a reference to the current response event object, which is an instance of the lexer class object and is generated by the lexer, and the current response block object. The current response block object holds a reference to the current state object.

The present invention is also directed to an object-oriented method for obtaining, from a telecommunications network, information regarding structure ancd connections in the network. The method generally comprises providing a response block object for receiving and temporarily storing parsed data, providing a current state object of a given class, receiving a line of data of an incoming data block, categorizing the line of data and storing a symbol corresponding to the category in an object, feeding or passing the object to the current state object, and thereafter (a) converting the current state object to a new state object of a different class depending in part on the given class and on the object message and (b) saving information from the line of data in the response object block.

The method may further comprise transmitting onto the network a request for information pertaining to structural components and operative connections of the network The incoming data block is then responsive to the request, and the providing of the response block object includes generating the response block object in response to the request.

Where an autonomous notification or report is received over the network prior to receiving a final line of the data block, a second response block object is generated or created for iretaining data in the autonomous notification or report. In addition, a pointer is inserted in the first response block object for identifying the second response block object. The second response block object is populated or filled with data from the autonomous report or notification. The first response block object is closed or delivered to the client applications program (graphical user interface, via the domain model) only after completion of population of the second response block object.

Generally, categorizing the line of data includes generating a response event object, populating the response event object with data from the line of data and generating and storing a symbol that corresponds to the category.

A parser in a craft interface device in accordance with the present invention is able to process blocks of data which are received autonomously. Such autonomous reports or notifications are unrelated to the system's parsing context at any given point in time. In addition, a parser in a craft interface device in accordance with the present invention can recover from a variety of communications errors, including, for example, disconnected or unresponsive equipment at a far end, syntax errors, CRC errors, commands denied by the far end equipment, and command failures.

In an object-oriented craft interface parser in accordance with the present invention, new parser states can be easily added, for example, if the grammar of the telephony language changes. The advantages of object-poriented programming in general include the ease of code reusability, arising from encapsulation. Other advantages include the facilitation of string or data stream revisions and CRC checking.

BRIEF DESCRIPTION OF THE DRAWINGS

FIG. 5A is an object association diagram showing the relationships among objects of the parser of FIGS. 4 and 5.

FIG. 14 is a table of the different states of the object-oriented state machine and parser of FIGS. 4 and 5, indicating the various transitions among the different states.

DESCRIPTION OF THE PREFERRED EMBODIMENTS

Telecommunications System

Figure 1:
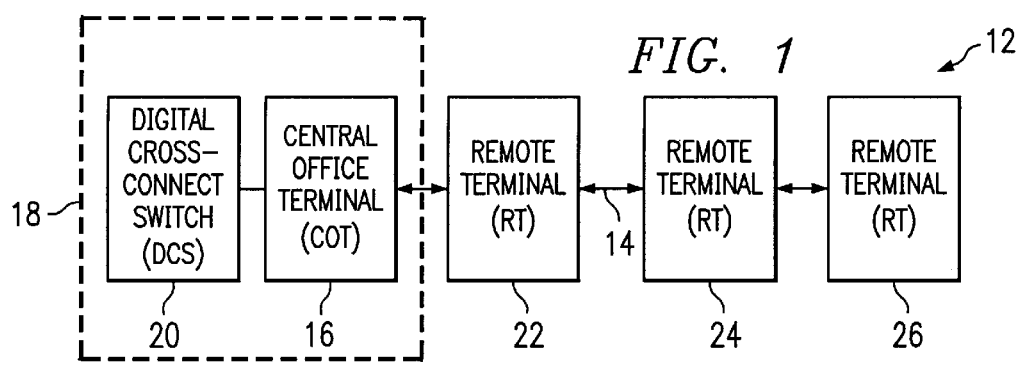
FIG. 1 is a block diagram of a telecommunications network.

As illustrated in FIG. 1, a Litespan™-type telecommunications system or network includes several Litespan™ nodes or terminals 12 connected together in a chain configuration by optical fiber telecommunications links 14. One terminal 16, called the Central Office Terminal (COT), is located in a Central Office (CO) 18 of a telephone company and communicates on one side with a digital cross-connect switch (DCS) 20 and on another side wath the chain of remote terminals (RT's) 22, 24, 26. The remote terminals 22, 24, 26 are typically located at geographically diverse locations in order to bring telecommunications service to different service areas. The digital cross-connect switch 20 links the central office tenninal 18 to other networks.

Figure 2:
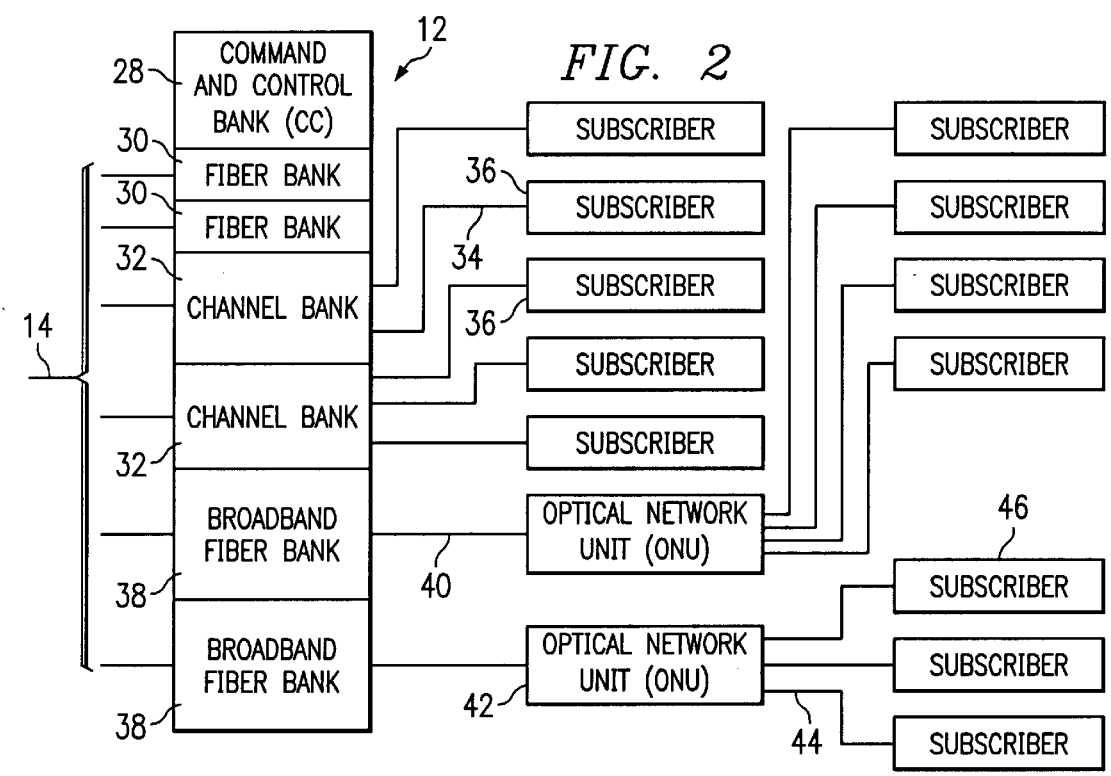
FIG. 2 is a functional block diagram of a node or terminal in the telecommunications network of FIG. 1.

As depicted in the functional diagram of FIG. 2, each Litespan™ terminal 12 has a common control (CC) bank 28 and access multiplexers including fiber banks 30 for various kinds of fiber connections and channel banks 32 for various kinds of subscriber drops such as POTS, ISDN, HFC. Channel banks 32 are connected via copper wire 34 to subscribers 36. Terminals 12 can also include Broadband Fiber Banks (BFB's) 38 which connect on one side to optical fiber chain 14 and on another side to a number of distribution fibers 40. Channel banks 32, High-Density Fiber banks (not illustrated), and Broadband Fiber Bank 38 are all instances of subscriber bank assemblies.

Distribution fibers 40 connect to further optical network: units (ONU's) 42 such as a so-called "brick," a Broadband Remote Transceiver (BRX), or a VEX. These ONU's 42 take fiber 40 on one side and on the other side provide narrowband and broadband services over copper wires 44 to a number of subscribers 46.

Figure 3A:
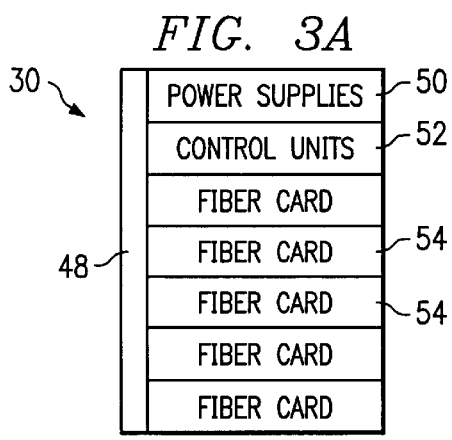
FIG. 3A is a block diagram of a fiber bank in a node or terminal as illustrated in FIG. 2.
Figure 3B:
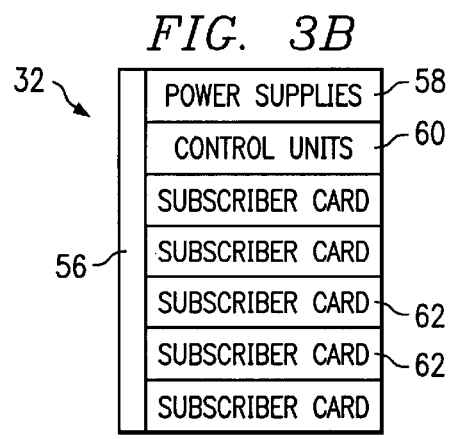
FIG. 3B is a block diagram of a channel bank in a node or terminal as illustrated in FIG. 2.

FIG. 3A shows components of a fiber bank 30, including a printed circuit board or "backplane" 48, power supplies 50, plug-in bank control units 52 and fiber cards 54. FIG. 3B shows components of a channel bank 32, including a single backplane 56, power supplies 58, plug-in bank control units 60 and subscriber line cards 62.

Terminals 12 are each implemented by a rack (not shown) having multiple shelves each with a few rows of printed circuit boards or "backplanes" 48 and 56. Printed circuit boards or backplanes 48 and 56 each have a plurality, e.g., sixty-five, of numerically ordered slots (not shown) in which various cards, such as fiber cards 54 (FIG. 3A) and subscriber line cards 62 (FIG. 3B), are vertically disposed.

CRAFT INTERFACE DEVICE

In order to perform maintenance and provisioning and related operations on the Litespan™ system or telecommunications network (FIG. 1), a craftsperson may use a Litecraft™ product, a PC-based craft interface product 63 (FIG. 4) programmed with the Snialltalk object-oriented language, which can be plugged into a terminal 12. The Litecraft™ maintenance and provisioning device 63 consists of three major subsystems shown diagrammatically in FIG. 4, namely, (1) a system or framework 176 for communicating with the Litespan™ system, (2) a domain modeling framework 69 representing the internal structure of a Litespan™ database, and (3) an application model or graphical user interface 64 which guides the user through Litecraft™ operations. Generally, the Litecraft™ maintenance and provisioning device communicates with a Litespan™ system or telecommunications network using the serial port of its host computer. This is the case regardless of whether a data link is established via a Litespan™ craft port, dialup connections via modem, or connections through an X.25 network.

Figure 4:
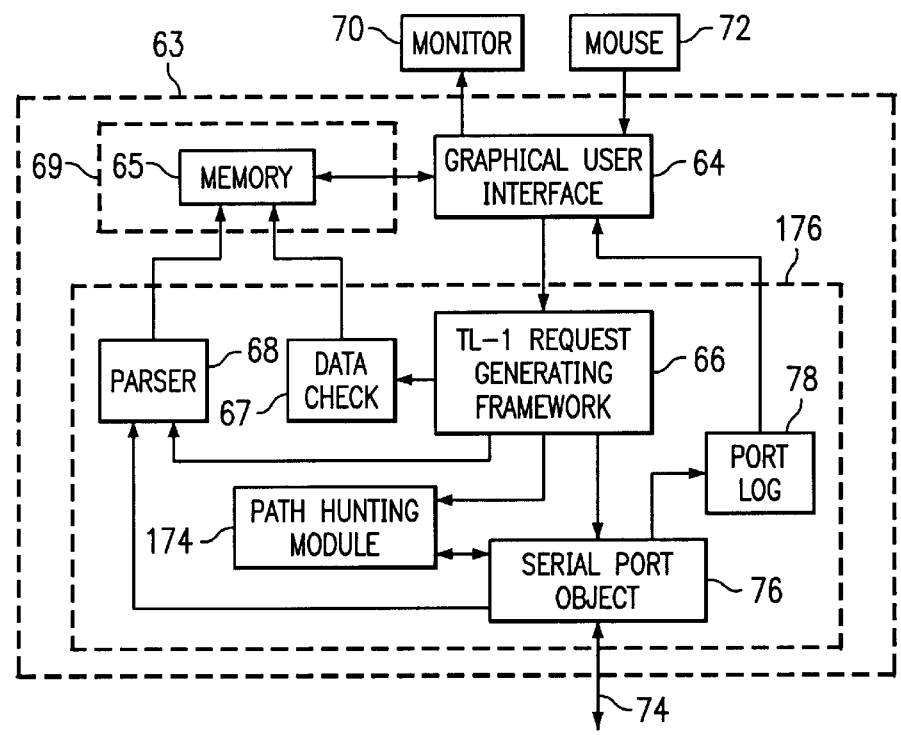
FIG. 4 is a block diagram of a craft interface device for peiforming maintenance and provisioning operations for the telecommunications network of FIG. 1.

As illustrated in FIG. 4, Litecraft™ -type PC-based craft device 63 for performing maintenance and provisioning and related operations for a telecommunications network as described above with reference to FIGS. 1–3B comprses graphical user interface 64, a request generating and processing framework 66 of functional groupings, and a parser 68. Graphical user interface 64 is operatively connected to a monitor 70 for displaying thereon structural components of the telecommunications network and for indicating, on the moritor, operating relationships among the structural components. More generally, graphical user interface 64 dislpays on monitor 70 graphical representations or icons of various interconnected network objects including software objects, database records, and physical and logical objects within the telecommunications network. Graphical user interface 64 also detects user commands executed, for example, via a display interactive input device 72 such as a mouse and/or keyboard.

In response to user commands detected by graphical user interface 64, framework 66 generates TL-1 commands (data requests) to be transmitted over a data link 74 to the network and for reading characters aiving from the network. Parser 68 is operatively coupled to framework 66 for parsing information from an incoming sequence of data lines or events. Parser 68 provides this information to graphical user interface 64 for display thereby on monitor 70. This information may be processed first by framework 66, before supplying it to graphical user interface 64.

In accordance with the principles of object-oriented programming, framework 66 includes or is operatively connected to a software-implemented serial polt object 76. The application code which uses this object does so by sending it messages to write a single character, write a line of characters, or read a (CR-or LF-terminated) line of characters. As it performs these services, port object 76 sends notifications to a "port log" 78 which is responsible for displaying and/or logging a stream of TL-1, a standard telephony communication language.

Domain Model Building

As illustrated in FIG. 4, craft interface device 63 includes an object-oriented memory 65 operatively connected to graphical user interface 64 and particularly to functional display and input detection modules thereof (not illustrated). Memory 65 contains, during at least some stage of a network accessing session, a plurality of model objects conesponding to respective physical objects of the network in different layers thereof The domain model objects have data slots or spaces populated with information pertaining to the internal structural components of selected parts of the telecommunications network. (Graphical Halogos of some of these model objects are shown in FIGS. 6–9.) Memory 65 also stores names for the domain model objects, those names being the same as the names of the corresponding physical object of the telecommunications network. Memory 65 is part of domain modeling framework 69 whose function is to represent the internal structure of a Litespan™ database.

Framework 66 and parser 68 are part of communications framework 176 which operates in part as a domain model builder operatively connected to graphical user interface 64 and to framework 69 for selectively building a domain model of the network in memory 65 in response to user requests for graphical displays of internal structures of physical network objects selected by the user. This domain model builder is operatively connected ito memory 65 for creating and populating model objects in the memory in response to the user requests.

Craft interface device 63, particularly request generating and processing framework 66, may also comprise a data check 67 (FIG. 16) operatively connected to memory 65 to determnine, after detection of a user request and prior to transmission of a request over serial object port 76, whether memory 65 is free of adequate information pertaining to an internal structure requested by the user.

Parser

Figure 5:
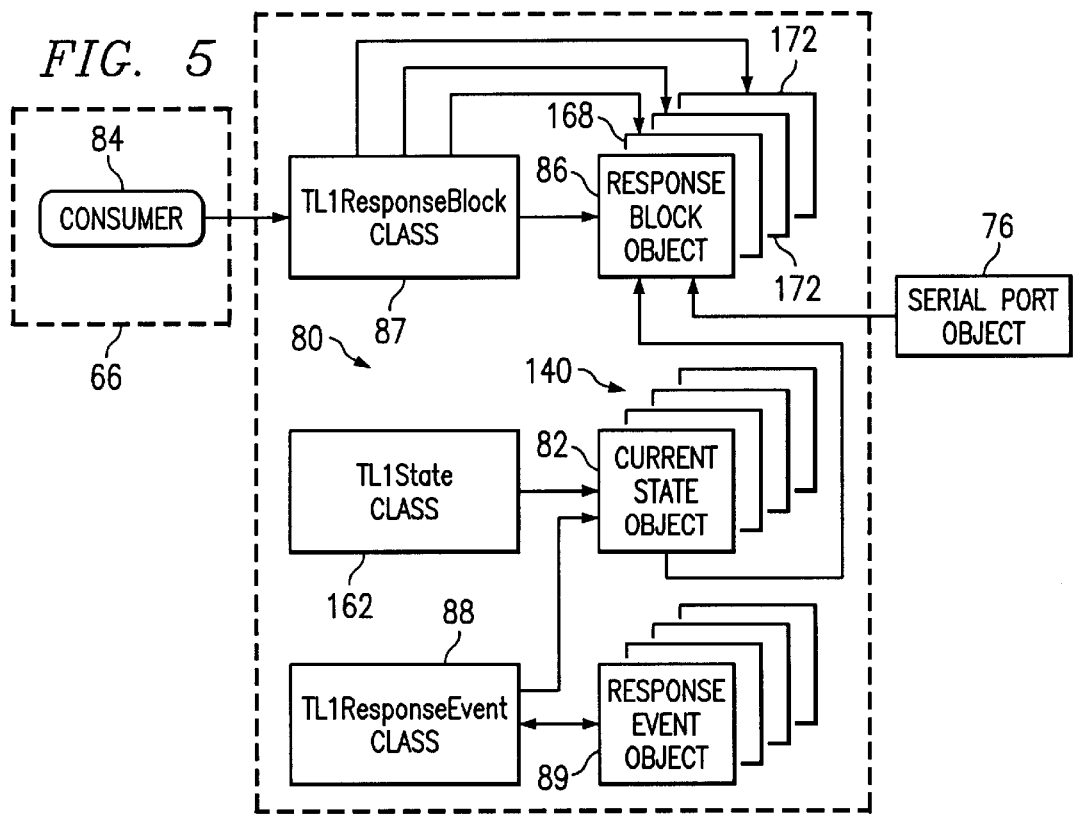
FIG. 5 is an object block diagram of a parser shown in FIG. 4.

FIGS. 5 and 5A show the finctionality of parser 68. Parser 68 is implemented in object-oriented programming by respective class objects and by other objects which are instances of the main classes or subclasses thereof. More specifically, parser 68 includes an object-oriented finite state machine 80, whose state is that of a current state object 82 taken from a group of different possible state objects 140 (see also FIGS. 10 and 12–14). The state of state machine 80 at any one time can change to any one of generally a plurality of predetermined states, depending on the class of the current state and on the type of an incoming message. State objects 140 are instances of subclasses of a top-ranked hierarchical class 162, called TL-1 State (see FIG. 12).

Parser 68 also includes a response block class object 87. Response block class object 87 is the object controlling the operation of state machine 80. Parser 68 further comprises a TL1ResponseEvent class object 88 defining the set of possible response events.

Response block 86 is generated upon the invoking of parser 68, particularly TL1ResponseBlock class object 87, by a consumer 84. Consumer 84 is generally a TL-1 comnmand or data request and a part of framework 66 which generates requests for information about the telecommunications network (FIG. 1). (Request generating and processing framework 66 is part of communications framework 176, which includes parser 68, a collection of TL-1 commands, related functions and response block 86, and which processes user requests detected via graphical user interface 64.) Response block 86 controls parsing of an incoming data block or series of data blocks constituting a response to a TL-1 command or data request. Response block 86 is the interface, the only point of contact, between consumer or TL-1 command 84 and parser 68, Response block 86 holds a reference to the current state of state machine 80.

TL1ResponseEvent class 88 generates symbols that represent event types, in response to incoming ASCII data lines. Each line, which is a part of a known TL-1 "response" or a TL-1 autonomous notification, corresponds to an event in the state machine 80. The event type of a given line is determined by examining the contents of the line in various ways.

A TL1ResponseBlock object retrieves a line or event of am incoming data block. TL1ResponseEvent object 88 (on the class side) categorizes the line and generates a response event object 89 that contains a symbol that represents the category (event type). The TL1ResponseBlock class object 87 sends the information as a parameter to the current state object 82 via the current TL1ResponseBlock object 86. This parameter, TL1ResponseEvent object 88 represents an event type. The current state object 82 responds to this message in a way which depends on the class of the current state object and the type of the event.

Generally, the response of the current state object 82 includes the extraction of information from the text line which generated the event. The current state object populates the response block object 86 with this information. The response of the current state object 82 may also include replacing itself with a different current state object, possibly of a different class or subclass of TL1State 162, In this way, parser 68 builds up a complete record of a single TL-1 response.

FIG. 5A is an object association diagram illustrating relationships among the various objects that collaborate to retrieve, parse, and deliver data to graphical user interface 64. The lines between the object signify associations including collaboration, instantiation, and containment. The diagram of FIG. 5A is divided into architectural layers, one of which is the parser 68. From this point of view, parser 68 is a collection of collaborating objects that retrieves, validates and assigns meaning to TL-1 data from serial port 76 and delivers this information via the consumer or TL-1 command object 84 to the graphical user interface domain model and particularly to a domain model object 77 thereof.

Each time framework 66 sends a TL-1 request to the telecommunications network (FIG. 1) over data link 74, that request is represented by a respective command object. This command object is primarily responsible for generating its command string and interpreting the response data. Each type of command object in craft interface device 63 is represented by a subclass of TL-1Command (a class object identifying the class).

In most cases, the client of a TL-1 request is interested in the result attribute of the request. If the request is for a simple action, the result should indicate whether of not the action was successful. If the request is a request for data, the result will typically be a collection of model objects of the telecommunications network.

TL-1 processing in framework 66 is typically routed through a model object. This object may receive a message asking the object to retrieve a certain set of domain model objects from the telecommunications network. The model object then creates a command object appropriate to the retrieval type, configures the command with any required parameters, processes the command and answers its result.

Figure 6:
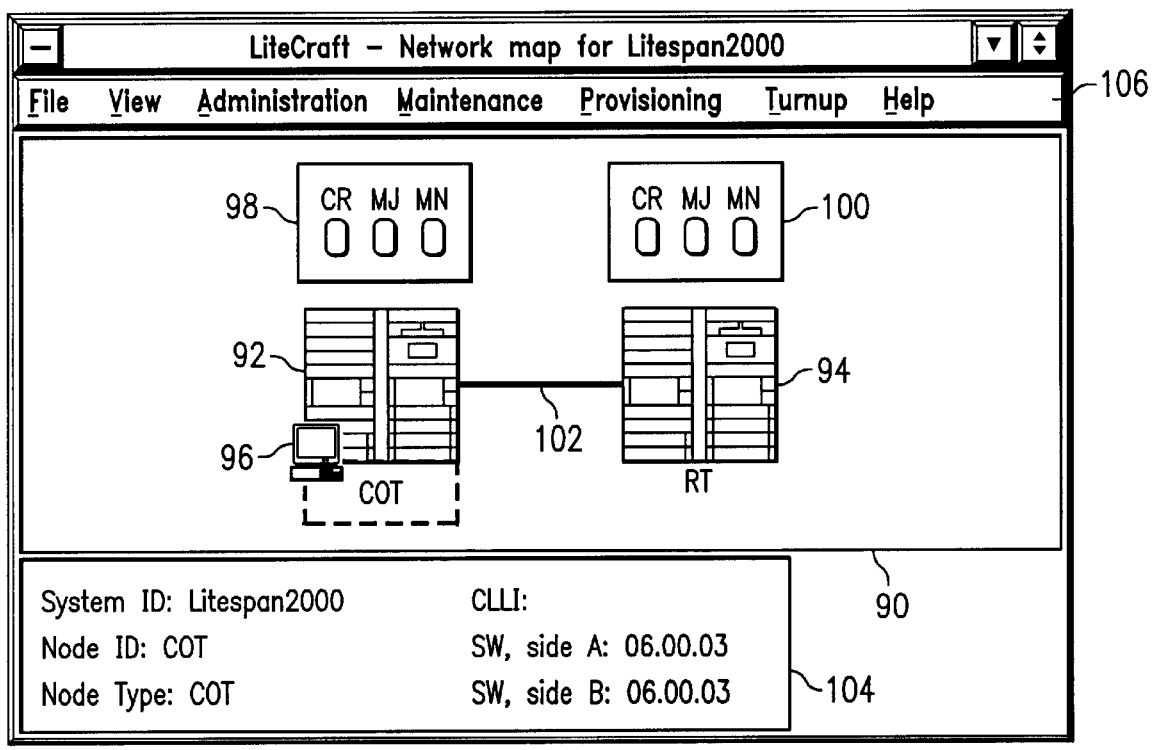
FIG. 6 shows an initial screen or window displayed by a craft interface device in accordance with the present invention upon log-in or connection to a telecorrrmunications network.

Upon connection of craft interface device 63 to a terminal 12 of the telecommunications network, the craft interface device downloads configuration information from the network using TL-1 and presents the configuration information graphically to the user via a window on monitor 70 (FIG. 4), beginning with a top-level diagram of the overall system, shown in FIG. 6. The configuration information is stored in memory 65 of craft interface device 63 as a set of domain model objects. The set of objects of the domain model represents the contents of one or more network databases and is constructed piecemeal, with only so muich information being retrieved from the telecommunications network as is necessary to present a desired display to the user.

Figure 9:
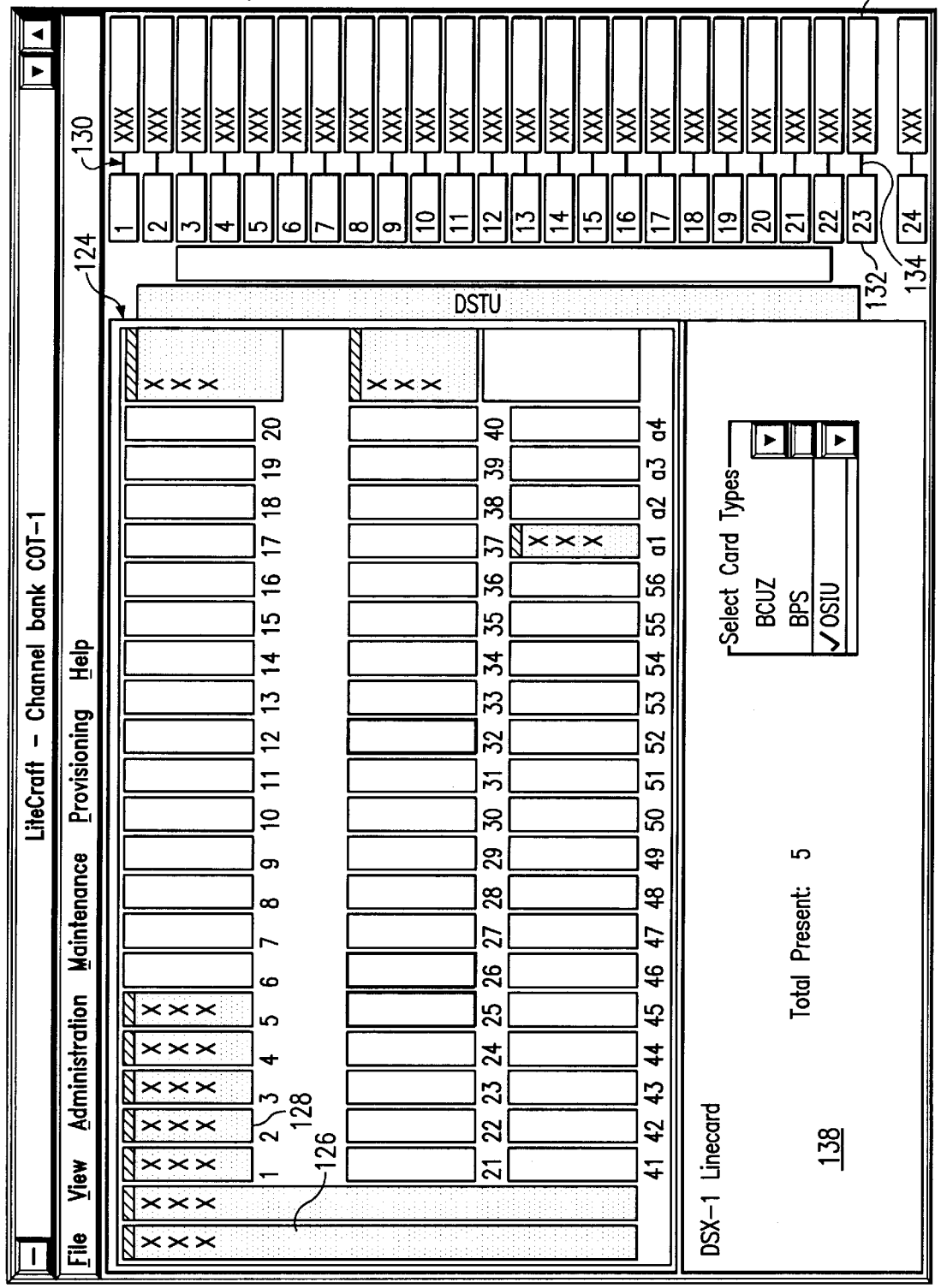
FIG. 9 shows a screen or window displayed by a craft interface device in accordance with the present invention in response to a user's mouse clck on an icon representation of a channel bank in FIG. 7.
Figure 10A:
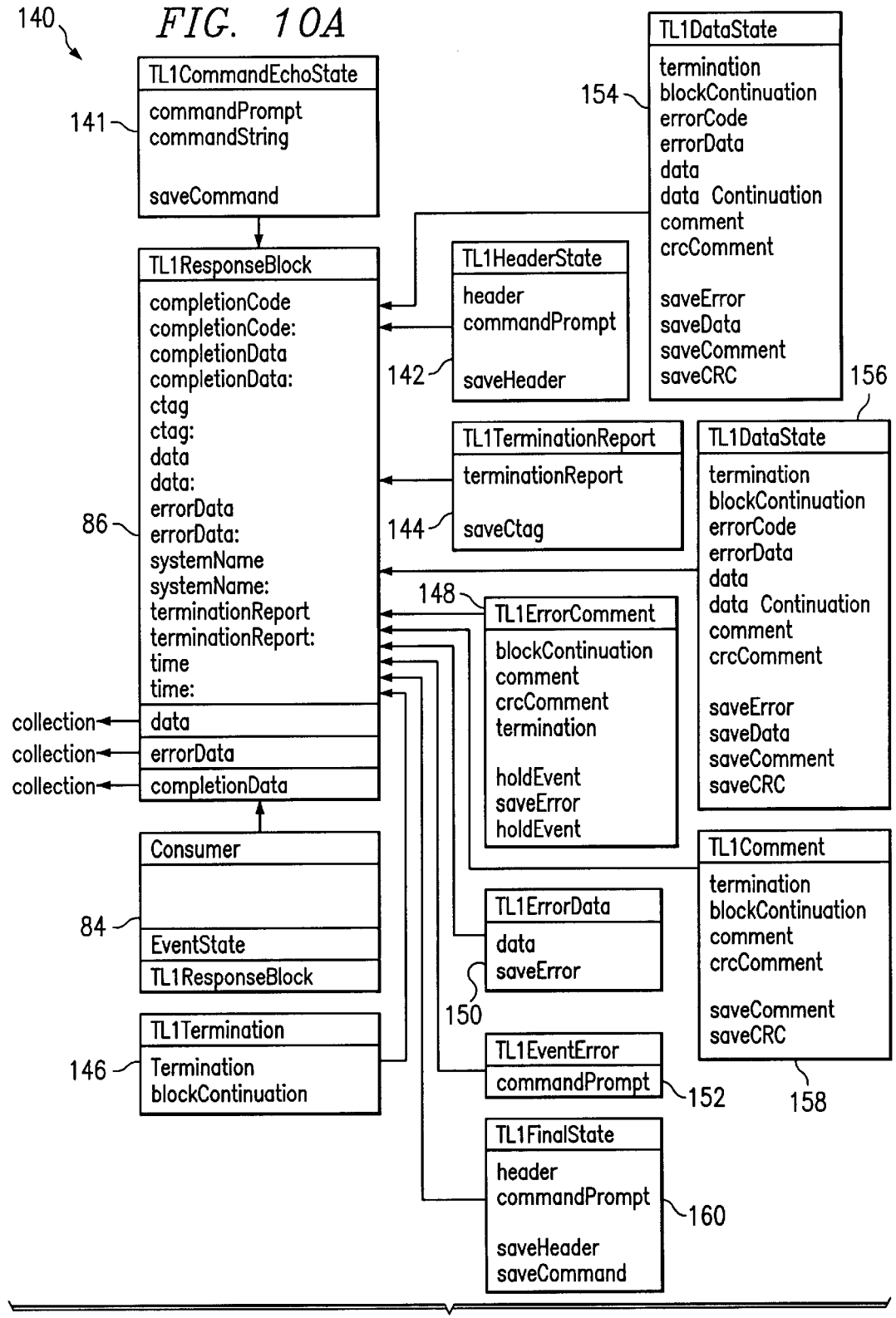
FIG. 10 is a diagram showing possible states of an object-oriented state machine included in the parser of FIGS. 4 and 5.
Figure 10B:
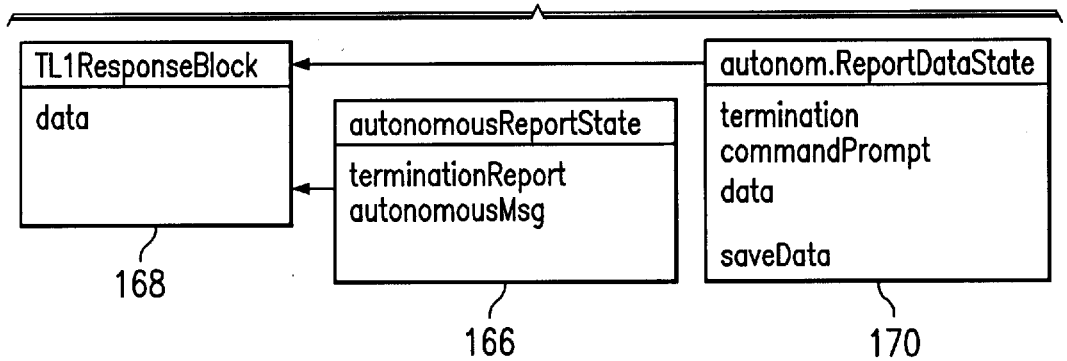

When the user operates mouse 72 (FIG. 4) and clicks on a component of the system, craft interface device 63 retrieves information about that component from the network and presents the retrieved information to the user as another graphic representation or display in the same window. The presentation of the telecommunications network to the user is thus a number of levels deep, enabling the user first to see the overall system (FIG. 6), then to see components in an individual terminal (FIG. 7), then to see individual access multiplexers (FIG. 9) within a terminal, then to see individual cards within an access multiplexer (FIG. 10). Moreover, the user can open multiple windows and browse through the entire system independently in each such window.

During the log-in procedure, a minimal set of information is retrieved from the telecommunications network to bootstrap the domain model. This minimal set of information includes the network map (FIG. 6), as well as the current software version and possibly alarm summary information, and is obtained trom the connected telecommunications node or terminal 12. For each node or terminal 12 (FIG. 1) in the telecommunications network, a domain model object is created in craft interface device 63 to represent the node in the model. The class instantiated to represent each node of terminal 12 depends on the type of system and the software version on the terminal control processor. In the object-oriented programming of craft interface device 63, the hierarchy of these type/version specific classes may be found under the principal class for nodes.

The domain model of the telecommunications network, located in memory 65 of craft interface device 63, assembles itself in response to external queries about its state. This piecemeal construction of the domain model may be termed "Lazy Retievid" and follows a pattern established by so-called "lazy initialization," which is a common practice in object-oriented programming. According to this Lazy Retrieval technique, memory 65 (FIG. 4) contains populated model objects corresponding only to physical objects of the network for which the user has requested a graphical display of internal structural components.

Display Screens Showing Different Levels of Telecommunications System

As illustrated in FIG. 6, a top-level screen display initially appearing upon link-up of the craft interface device of FIG. 4 to the telecommunications network of FIG. 1 shows, in an equipment pane 90 of the screen display, a first icon 92 corresponding to the central office terminal or COT 16. Only one remote terminal or RT 22 is represented in equipment pane 90 for purposes of simplicity. In actuality, all remote terminals 22, 24, 26 connected in the communications network are represented by respective icons in equipment pane 90 on start-up. A PC icon 96 is shown overlapping the COT icon 92 to indicate that the craft interface device 63 (FIG. 4) is connected to the telecommunications network at the COT. In the equipment pane are also shown alarm summary displays 98 and 100 for each graphically represented terminal 16, 22 (FIG. 1), above the respective icons 92 and 94. The alarm summary displays 98 and 100 indicate the type and associated number of alarms. Alarm boxes CR, MJ and MN are filled in with respective colors if there are more than one critical (CR) alarm, more than one major (MJ) alarm, or more than one minor (MN). alarm, respectively. If there are no alarms, the alarm boxes CR, MJ, and MN are white or noncolored. An operational relationship between successive nodes or terminals 12 and 22 is indicated on equipment pane 90 by a line 102 between icons 92 and 94, The color of line 102 is varied to represent whether the remote terminal 22 (FIG. 1 ) is communicating with the connected, COT node 16, whether the data link is provisioned but not communicating, whether there is no record for the data link retrieved from the connected node, or whether an abnormal condition exists.

The top-level screen display illustrated in FIG. 6 also has a detail pane 104. Upon a use of mouse 74 (FIG. 4) to click on a node icon 92 or 94 and upon a selection of "Show Node Summary" from a "View" menu choice on a menu bar 106, detail pane 104 sets forth particulars about a respective selected node 16 or 22. If the user clinks on line 102 and then chooses "Data Link Status" from a "Provisioning" menu choice on bar menu 106, detail pane 104 sets forth particulars about the data link.

The View menu choice on menu bar 106 generally enables a user to view selected windows, retrieve the contents of a current vindow, and view detailed and summary information. In particular, if the user mouse clicks on a node icon 92 or 94 and then chooses a "Zoom In" selection from the View menu, graphical user interface (GUI) 64 (FIG. 4) of craft interface device 63 operates to provide on monitor 70 another graphical representation or display (FIG. 7) showing internal structural components of the selected node or terminal. As discussed above, these structural components are absent from the memory of the craft interface device 63 at the instant the user makes the selection. This information is now retrieved from a network database, in particular from the selected node or terminal. A clicking via mouse 74 on a node icon 92 or 94 results in a message being sent to a model object in memory conesponding to the selected node or terminal. The message asks for state information and includes a request for objects "contained by" the model object receiving the message. The model object checks its own state to determine whether the requested objects have already been retrieved (during the same network access session, the user might return to the network map display). If the model objects have already been retrieved from the network, the model object answers the "cached" objects. If the requested objects, corresponding to respective structural components of the selected node or terminal, have not been retrieved, then the model object retrieves them, "installs" them into the domain model and answers them.

The "Lazy Retrieval" of model objects from the network is frequently initiated when a GraphicComposite object is setting up a map between the domain model objects and respective display regions. During this process, the composite object traverses the domain model, requestng the objects the composite needs to display. If these objects have not already been "cached," they will be retrieved at that time and then supplied to the requester.

Additional lazy retrievals may also occur when model objects are displaying themselves. In these cases, a model object may send itself a message asking for a visible property, e.g., color. If the value of this visible property depends on some not-yet retrieved object, a lazy retrieval of the required object is initiated.

Figure 7:
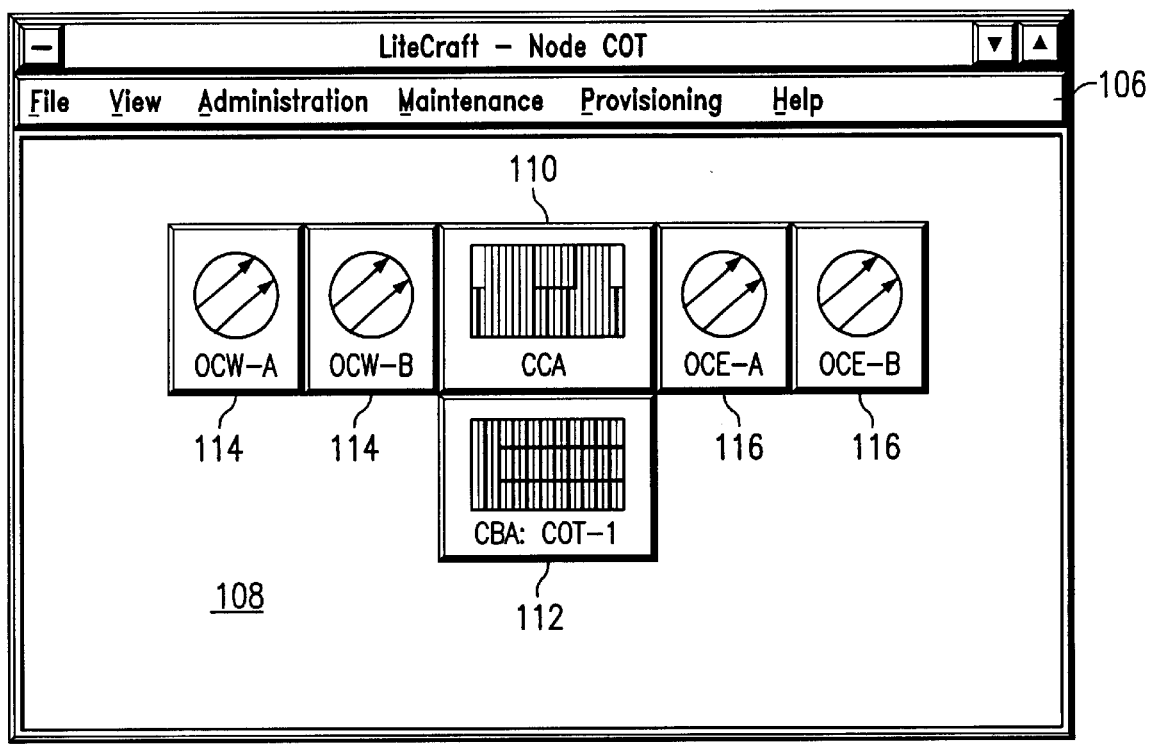
FIG. 7 shows a screen or window displayed by a craft interface device in accordance with the present invention in response to a users mouse click on an icon representation of a network node or terminal in FIG. 6.

FIG. 7 shows a screen display on monitor 70 by graphical user interface 64 (FIG. 4) in response to a clicking via mouse 74 on a node icon 92 or 94. This new screen display includes an equipment and facilities pane 108 showing graphic representations of internal structural components of the selected node or terminal. The graphic representations include a common control assembly icon 110, a channel bank assembly icon or block 112, and icons for SONET optical carrier facilities west (OCW) 114 and east (OCE) 116. 1These icons are graphic representations or symbols of actual structural or physical components of the selected mode or terminal. For example, icon 110 corresponds to common control bank 28 in FIG. 2, while icon or block 112 corresponds to a channel bank 32 (only one shown in FIG. 7 for simplicity purposes). Again, structural elements of any one of these components may be accessed in a new display by mouse clicking on the respective icon or graphical representation and then choosing a "Zoom In" selection from the View menu choice of menu bar 106.

Figure 8:
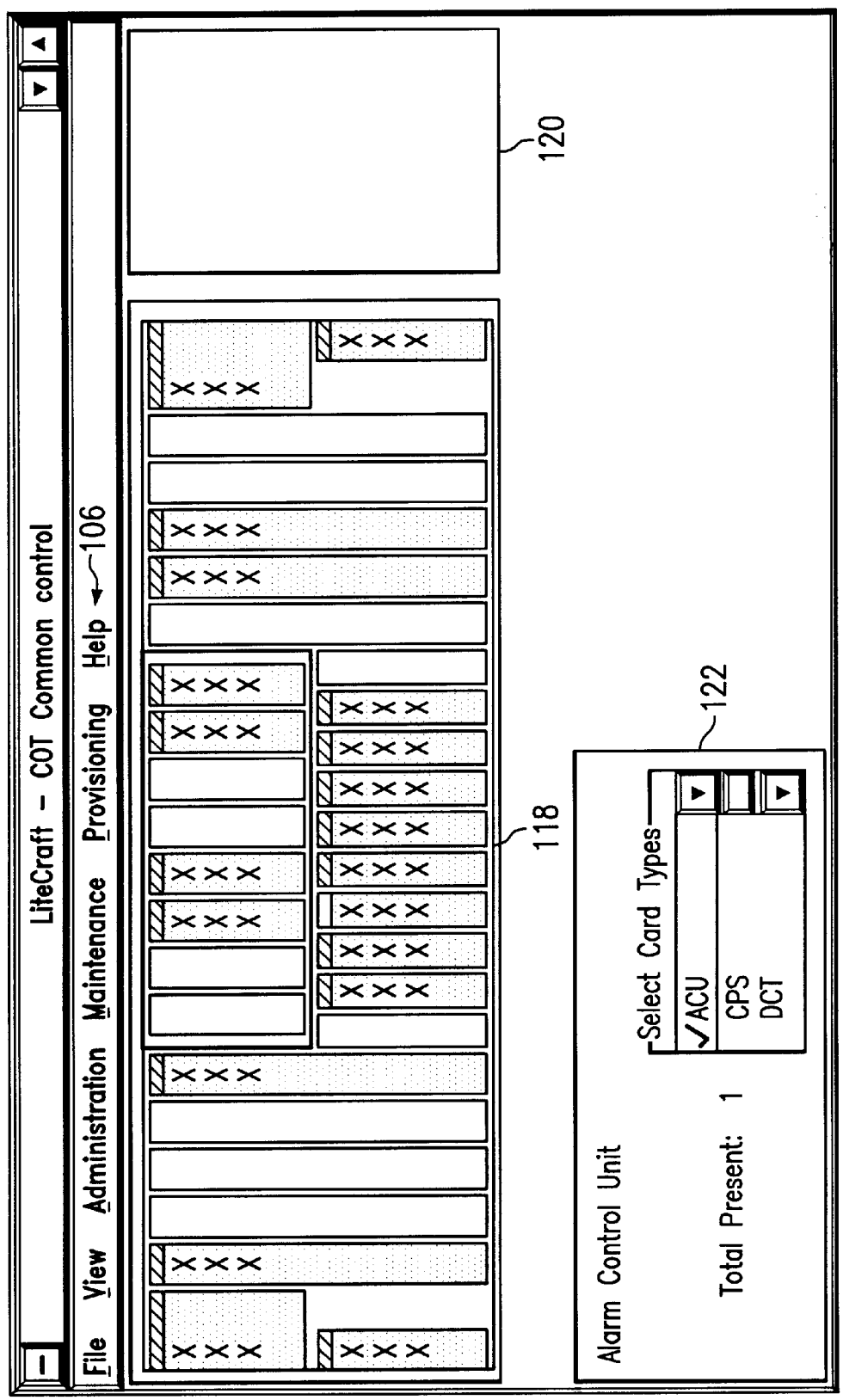
FIG. 8 shows a screen or window displayed by a craft interface device in accordance with the present invention in response to a user's mouse click on an icon representation of a command and control bank in FIG. 7.

Representative substructures of Common Control Assembly (CCA) are depicted in FIG. 8. The CCA display or window includes an equipment pane 118 which shows graphical representations or blocks corresponding to assigned equipment retrieved from the common control bank 28 (FIG. 2) or broadband shelves. The CCA screen display farther includes a facilities pane 120 which shows subscriber facilities when a broadband interface card is selected. If a card with no facilities is selected or if multiple cards are selected, then facilities pane 120 will be blank. The CCA screen display also includes a detail pane 122 which shows detailed information about the system configuration. FIG. 9 shows a display on monitor 70 provided by graphical user interface 64 in response to a clicking via mouse 74 on the channel bank assembly block or icon 112. An equipment pane 124 shows, in graphical form, assigned and/or equipped equipment retrieved from the selected channel bank assembly 32. Equiprnent pane 124 specifically includes two control unit icons or blocks 126 and subscriber line card icons 128 arranged in three rows as the actual subscriber line cards are disposed in respective shelves of a terminal rack.

The channel bank screen display of FIG. 9 also includes a facilities pane 130 showing, in iconographical form, the facility or facilities assigned to a selected card. If a card with no facilities is selected, or if multiple cards are selected, then facilities pane 130 is blank. If a graphically represented facility 132 on a selected line card is cross-connected, facility pane 130 shows a horizontal line 134 between that facility and the respective cross-connected far-end facility 136. If the far-end facility 136 can be reached through a data link, then its access ID is also shown.

The channel bank screen display of FIG. 9 also includes a detail pane 138 showing particulars about equipment and subscriber facilities. To view the detail pane, the user selects "Plug-In Equipment Summary" from the View menu.

TL-1 Response Processing

Each time a user first clicks on a structural icon during a network accessing session, for example, in the network map display of FIG. 1, the node display of FIG. 7, the Common Control Assembly display of FIG. 8, or the channel bank display of FIG. 9, framework 66 (FIG. 5) sends a TL-1 command or request to the telecommunications network (FIG. 1) over data link 74 to obtain the domain model object information pertaining to the internal structural elements of the selected component. This TL-1 command or request has a counterpart in consumer 84. A primary response block object 86 (FIG. 5) is generated in response to the passing of a message by consumer 84 to TL1ResponseBlock class object 87. Response block object 86 receives and holds the information arriving from the network in response to the transmitted TL-1 command or request, TL1ResponseBlock class object 87 is the controlling object in parsing a TL-1 data block carrying part of all of the requested information. Response block object 86 contains a reference, parserState, to current state object 82 and a reference, data, to a block of TL-1 data stream, The function of the data reference is to return the next line of TL-1 data until all lines of the data block have been processed. Certain elements have been identified frorm a TL-1 data stream and preserved in instance variables of collections for further reference.

Each line of an incoming data block is looked at by the TL-1 response event object 88 (FIG. 5), which determines whether the line is legal in the TL-1 telephony language. This response event object encapsulates rules for what a proper token or line is in TL-1. Once a line of a data block is determined to be proper, it is passed onto current state object 82 which extracts the data.

TL-1 commands are produced by a series of user inputs that validate and translate to TL-1 request messages. TL-1 data blocks are messages that appear in direct response to a TL-1 request transmitted by framework 66 over data link 74. Generally, a response to a TL-1 request will arrive before a new TL-1 request is transmitted. However, that is not necessarily the case. There will be, however, a one-to-one correspondence between transmitted TL-1 requests and responses received in response to the requests. A ctag identifier will connect a transmitted TL-1 request and the TL-1 data block or blocks received in response to that request. Thus, one TL-1 response may span across several TL-1 data blocks which will all be linked together by one ctag.

All TL-1 data blocks each contain a Header, a Termination Report, Data and a Completion Conmment. The response data may deviate a little depending on the type of request. The Termination Report status supplies information about the combination of valid data and errored data that will follow. The following are samples of three different combination of TL-1 responses depending on the type of termination report received.

DENY—There is a single error code indicating a global failure for the entire input command or there is a set of error codes specific to individual access identifications.

DENY—There is a single error code indicating a global failure for the entire input command or there is a set of error codes specific to individual access identifications.

| Example 1 | Example 2 |
|---|---|
| ᴧᴧᴧLitespan2000 93-09-29 14:43:23 | ᴧᴧᴧLitespan2000 93-09-29 14:43:23 |
| M O DENY | M O DENY |
| ᴧᴧᴧSNVS | ᴧᴧᴧMERR (Multiple Error) |

-continued

| Example 1 | Example 2 |
|---|---|
| ᴹᴹᴹ"COT-1-2::" | ᴹᴹᴹ"RT::ERCDE=SSTP" |
| ᴹᴹᴹ/* Card Slot . . . */ | ᴹᴹᴹ/*Far Terminal */ |
| ᴹᴹᴹ/* 0 T1 Edited */ | ᴹᴹᴹ"RT::ERCDE=SSTP" |
|  | ᴹᴹᴹ/* Far Terminal */ |
|  | ᴹᴹᴹ/* 0 T1 Edited */ |

PRTL—Some of the equipment was edited, entered, deleted or rtrieved as requested. There are error codes specific to individual access identifications that failed.

```
ᴹᴹᴹLitespan2000 93-09-29 14:43:23
M 44 PRTL
ᴹᴹᴹ"COT-1-1:DSIU, DSIU . . ."
ᴹᴹᴹ"RT: ERCDE=SSTP"
ᴹᴹᴹ/* Far Terminal Communication Problem */
ᴹᴹᴹRT5-1-1:DSIU, DSIU . . ."
ᴹᴹᴹ/* 4 Eqpt Retrieved */
;
```

COMPLD—The equipment was changed or retrieved as requested.

```
ᴹᴹᴹLitespan2000 93-09-29 14:43:23
M 1 COMPLD
ᴹᴹᴹ"COT-1-1:DSIU, DSIU . . ."
ᴹᴹᴹ/* 1 T1 Facilities Retrieved */
;
```

As discussed above, TL-1 response event object 88 (FIG. 5) takes a TL-1 string, analyzes it and returns an event. The valid events are listed in the table of FIG. 14 and shown along state transitions in the state diagram of FIG. 13, with the number sign (#)inserted as a leading character to identify the events as such. These events include the following:

header—The header identifies the telecommunications system, for example, as a Litespan™ system containing Litespan™ terminals. The header contains the node name, date and time information. Analysis of this line or string seeks three blanks plus alphanumeric characters to predict the header.

terminationReport—The termination report contains the ctag which is used to tie a TL-1 request to the respective response. Analysis seeks the character "M" in the first position of the string being analyzed.

termination—The termination character is used to predict the end of TL-1 data for a TL-1 request. Analysis seeks the character ";" in the first position of the string being analyzed. #blockContinuation—The block continuation is used to signal that data will continue on into the next data block from the Litespan™ system. Analysis seeks the character ">" in the first position of the string being analyzed.

commandPrompt—The command prompt echoes the TL-1 command sent to the Litespan™ system. Analysis seeks the character "<" in the first position of the string being analyzed followed by the TL-1 command.

errorCode—The error code indicates a global failure for the entire input command from the Litespan™ system. If "MERR" is present as the error code, then multiple messages will follow. The message will comprise the error code followed by data to identify the equipment in default then a comment to give information on the faulting equipment. Analysis seeks three blanks plus four characters to predict the error code. The four characters cannot contain a quote.

data—The data identifies the Litespan™ equipment data information. Analysis seeks three blanks plus a quote followed by a data string.

errorData—The error data identifies equipment which has faulted. This type of error data is present when the data block contains good data and errored data. This would be present in a PTRL termination report type data block. Analysis see ks three blanks plus a quote mark followed by a string that contains the expression ERCDE=.

comment—The comment identifies faulting equipment or gives information about the completion of a command. Analysis seeks three blanks plus a front slash mark (/).

crc—This is a comment that contains an ASCII character string representing a CCITT CRC 16-bit checksum calculated on the data block buffer at the connected Litespan™ terminal. Analysis seeks three blanks plus a front slash mark (/) followed by the character string "CRC=", inProgress—Some TL-1 commands are delegated to a background process in the Litespan™ network. This allows other TL-1 commands to be processed while the backgound process completes the action specified by the command. The initial response for this type of command is a line containing the character string "IP" followed by a command prompt. When the background process completes, the full response to the command appears as an autonomous report in the TL-1 response stream. Analysis seeks three blanks plus the character string "P".

dataContinuation—Data continuation is the same as data but is the result of data being continued on the following line because of the length of the data. Analysis seeks the mark "<" and three blanks.

autonomousMsq—The Litespan™ network may generate autonomous messages that report the status of equipment, alarms, conditions or other network entities or events. These messages are not invoked by a TL-1 command, but are generated spontaneously by network elements. Analysis seeks a single space followed by either the character string "REPT" or the character string "CANC".

commandstring—The Litespan™ network echoes all commands that it receives directly back to the sender. This is designed to allow a user to interact with a dumb Litespan™ terminal. The Litecraft™ parser must compensate for this command echo by detecting it, moving to the correct state and refraining from passing the echo back to the consumer as though it were a response. Analysis seeks a termination character ";" in the response line.

blankLine—Blank lines are lines that do not matter such as ^C, blank line, and crlf combinations.

unidentifiedLine—Any string that does not fit into one of the above cases is considered unidentified.

State Machine

FIG. 10 shows a set or collection of possible state objects 140 of the object-oriented state machine 80 (FIG. 5). Each state object shown in FIG. 10 may become the current state object of the machine. The identity of the current state object 82 is encoded in the reference parserState held by response block object 86. Set or collection 140 includes a command echo state object 141, a header state object 142, a termination report object 144, a termination object 146, an error comment object 148, an error data state object 150, an event error state object 152, a data state object 154, a continuation data state object 156, a data comment state object 158 and a final state object 160, a prompt sync state object 164, an autonomous report state object 166, and an autonomous report data state object 170, Generally, these possible state objects find a rough correspondence to the valid TL-1 response events listed above.

Command echo state object 141 is an initial object in a TL-1 request processing procedure. This state awaits the echo back of the command or request which initiates the procedure.

Figure 11:
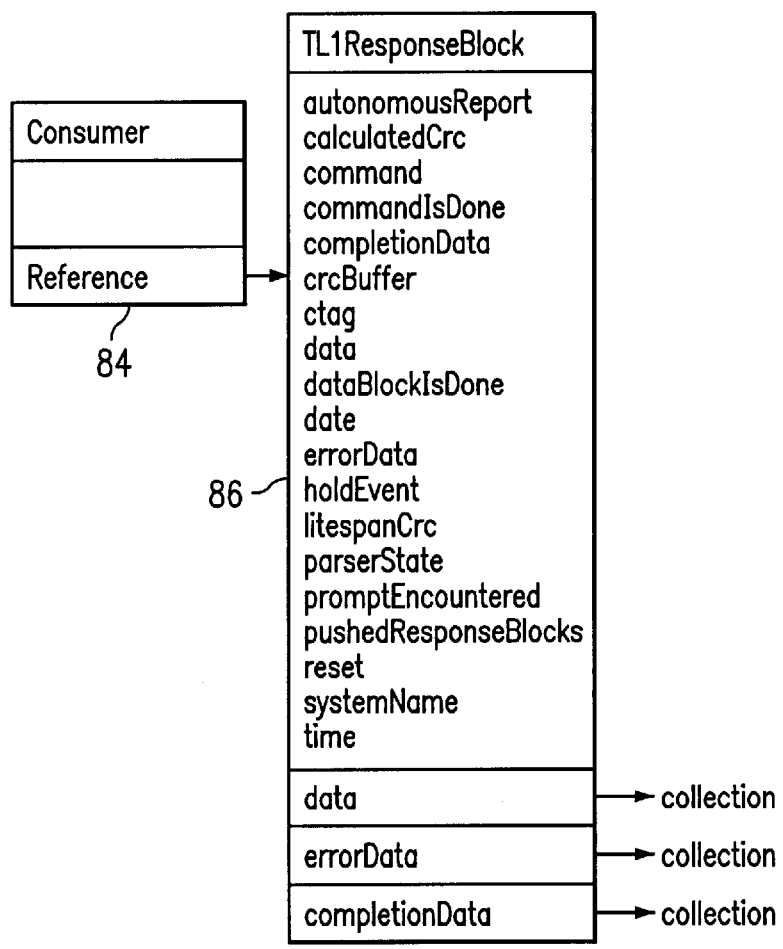
FIG. 11 is representation of a response block object contained in the parser of FIGS. 4, 5, and 10, showing types of data block information held by the response block object in respective buffers during a parsing operation.

FIGS. 10 and 11 show the response block object 86. This object collects all information contained in an incoming TL-1 response, whether a single or multiple TL-1 data blocks, and holds that information in various buffers for future use. As indicated in FIG. 10 by arrows extending from various state objects 140 to response block object 86, the various buffers of the response block object are filled as a result of action by different state objects. Where the information is delivered to craft interface device 63 pursuant to a TL-1 request, the completely filled or populated response block object and accordingly the information contained therein are delivered to a client request in an applications program, generally graphical user interface 64. The information preserved in response block object 86 includes the following, indicated in the diagram of FIG. 11:

autonomousReport—Response block 86 may hold a String describing the type of autonomous report, if any, stored in the response block object.

Litespan™ Crc—Response block object 86 holds the CRC value taht is received from the Litespan™ telecommunications network, particularly from the connected Litespan™ terminal, command—The TL-1 data request to the Litespan™ network, This data request is echoed back as a command prompt and saved.

commandIsDone—Response block object 86 holds a boolean (true or false) value indicating whether or not all response data corresponding to a given command has been received.

completionData—Response block object 86 holds a collection of TL-1 completion comments. Completion comments refer to the number of changed or retrieved requests.

crcBuffer—Response block 86 holds a buffer in which response data is stored as it is received. The contents of this buffer are subsequently used as the basis for the calculatedCrc.

ctag—Response block object 86 holds the ctag identifier used to connect the TL-1 response to the respective TL-1 request.

data—Response block object 86 holds a collection of valid TL-1 data.

dataBlockIsDone—Response block object 86 holds a boolean value indicating whether or not the end of the current data block has been reached.

date—Response block object 86 holds the date extracted from the header.

errorData—Response block object 86 holds a collection of TL-1 errored data and comments.

holdEvent—Response block 86 may hold a blockContinuation event received at the end of a data block if more data is expected in subsequent data blocks.

litespanCrc—Response block object 86 holds the CRC value that is received from the Litespan™ telecommunications network, particularly from the queried Litespan™ terminal or terminal component.

parserState—Response block 86 holds an instance of one of the subclasses of TL1State; this instance represents the current state of the state machine.

promptEncountered—Response block 86 holds a boolean value indicating whether or not a prompt has been received from the Litespan™ telecommuncations network during parsing of response data.

pushedResponseBlocks—Response block 86 holds a collection of response blocks which have been generated in response to autonomous reports received during processing of the response block.

reset—Response block 86 holds a boolean value which allows the response block object 86 to terminate parsing of a given response block and reset the state machine.

systemName—Response block object 86 holds the system name extracted from the header.

time—Response block object 86 holds the time extracted from the header.

Current state object 82 has control of the events being evaluated and does a state change when necessary. TL1 response block object 86 contains all parsed data and is passed to each succeeding state.

Response block object 86 is initially set up as an instance of TL1 ResponseBlock class object 87 in response to the message of consumer 84. A response event 89 is created as an instance of TL1ResponseEvent class object 88 in response to an incoming TL-1 data string, retrieved from a TL-1 data block stream by serial port object 74. TL1ResponseEvent class object 88 acts as a lexer to determine the legality of each line of an incoming data string or data block. TL1ResponseBlock class object 87 passes the lines to state machine 80 via instances of TL1ResponseBlock object 86.

A role of consumer 84 is to keep a reference to the response block object 86 until the end of the TL-1 data block stream has been reached or until the current state object is a final state. At that juncture, the information stored in response block object 86 is complete and ready for passing to the requesting model object of the graphical user interface 64.

State machine 80 is implemented so that each state is encoded into a separate object from among collection or set 140. The current state object (or series of current state objects) is responsible for handling all the input events and can inherit from its parent, TL1 State 162, so that the system can unconditionally give all events to the state object. The current state of the system is indicated by the current state object 82. That object will process the event and then return another state object. The state object returned may be the original state object or, if an event caused a state transition, then a different state object from among the objects in set 140 (FIG. 10). Because of the number of state changes involved, a class variable will hold an instance of a state and this instance will be released when a state change is initiated.

Figure 12A:
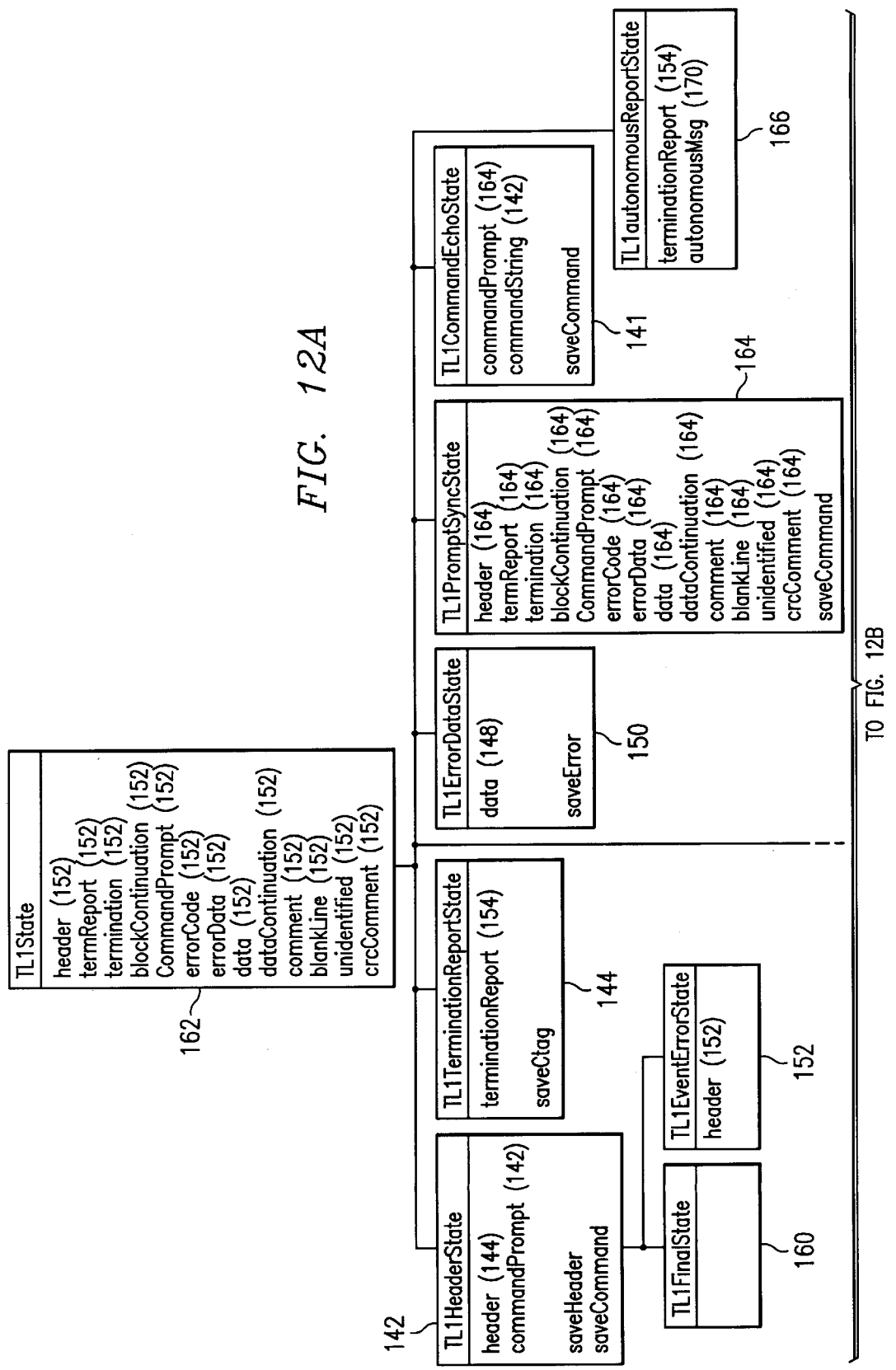
FIG. 12 is a class hierarchy diagram for the possible states of the parser of FIGS. 4 and 5 and of the object-oriented state machine included therein.

Each state name (see FIG. 10) implies that the expected event will cause a state transition. For example, header state object 142 (name: TL1 HeaderState) will transmute or transit to the termination report state object 144 (name: TL1TerminationReportState) when the #header event arrives. Each state object of set 140 (FIG. 10) is an instance of the abstract class TL1 State 162 or a subclass thereof The abstract class does not fully implement its protocol; no instances of abstract classes may be created. The role of the abstract class is to specify the protocol common to all of its subclasses, with the subclass providing the implementation where no common implementation can be provided in the abstract class itself. If an event is not defined in the subclass, then the event will default to the TL-1 State state 162 (FIG. 12). The Class Hierarchy, illustrated in FIG. 12, shows each state of the state machine, including an initialization state 164, named TL1PromptSyncState, and defines what events each state will address. In FIG. 12, numbers preceding state names are identifiers used only in the diagram, while the numbers in parentheses following each event identify the transitions to the next states, thereby identifying the Hierarchy and commonality among states. Any data that is extracted from the TL-1 string is expressed in the symbol "saveXXXX" where "XXXX" identifies the type operation being performed, examples being saveHeader and saveCtag.

The TL1ResponseBlock class object 87 has a method, or subroutine, that is the driver for the parser. This method is code that generates instances of response block object 86. There is only one current state object and possibly several response block objects, depending on whether there are any incoming autonomous notifications or reports, as discussed hereinbelow.

TL1ResponseBlock class object 87 creates an instance of TL1ResponseBlock object 86 and assigns it the initial TL1State object 82. TL1ResponseBlock class object 87 then sends a message to the TL1ResponseBlock object 86, causing it to read a line of ASCII text from an incoming TL-1 response block. TL1ResponseBlock object 86 delegates this task to serial port object 76. The data line is passed back to TL1ResponseBlock class object 87, which, in turn, passes the line to TL1ResponseEvent class object 88, which categorizes the line and sends back an instance of TL1ResponseEvent object 89 containing a symbol that represents the event type or category of the line. TL1ResponseBlock class object 87 sends the information to the current state object 82 via the TL1ResponseBlock object 86, which causes the current state object 82 to construct a message from the symbol and the data line. The current state (currentState) object 82 then sends this message to itself with the data line as a parameter. If the event type is one that causes a state transition, a new current state object 82 is created; if no state transition is required, the same current state object 82 will be retained in the TL1ResponseBlock object 86.

As the TL1ResponseBlock class object 87 receives lines during parsing, it collects them into a variable, crcBuffer which is contained in the TL1ResponseBlock object 86. At the end of each data block from the Litespan™ network is a ASCII representation of a CCITT hexadecimal CRC code which is calculated at the connected Litespan™ terminal and which is saved in the litespanCrc variable of the response block object 86. When the data block is completely received, TL1ResponseBlock class object 87 performs a CRC check as described in concept by Greg Young et al. in EE0152 "Litespan 2000 Software-OMAPS Protected TL-1 Communications." TL1ResponseBlock class object 87 compares the two calculations. If the CRC Calculations are the same, the parsing process continues. If not, an exception is generated and a parsing error is reported to the consumer.

Figure 13:
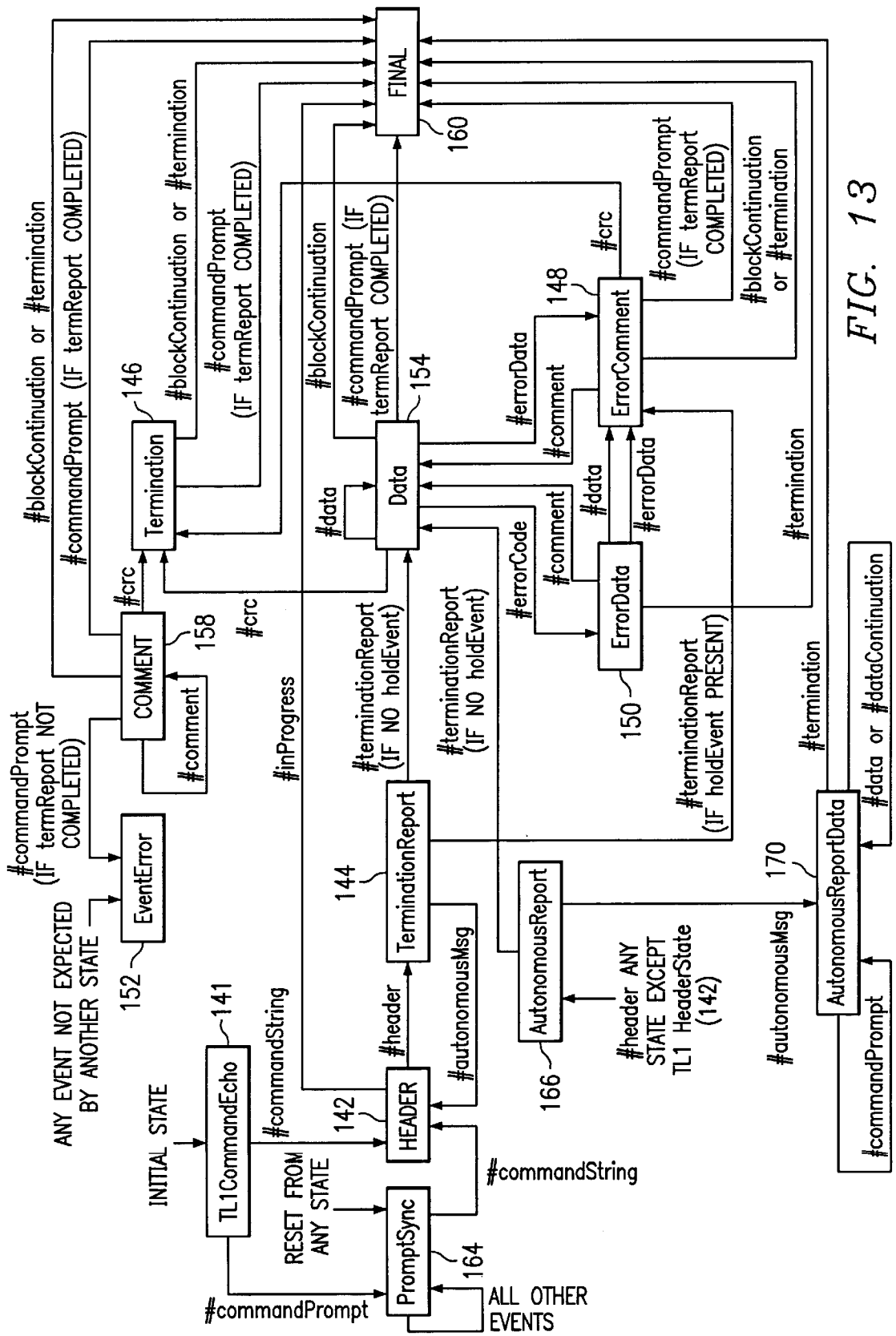
FIG. 13 is an event state diagram showing the different states of the object-oriented state machine and parser of FIGS. 4 and 5 and the transitions among the different states.

FIG. 13 is an event state diagram wherein the various possible states of the state machine are labeled with the same reference numerals as in FIGS. 10 and 12. The event state diagram shows the persistence of a state, as well as transitions to other states depending on the type of message received. In FIG. 13, the messages, which correspond to input events, are identified with the number sign (#) as a leading character. If an event is not shown as a transition or a loop, then the current state object changes to the event error state 152, An event of #reset in any state clears the holdEvent variable and changes the state to the PromptSync state 146. Events are derived from raw TL-1 data with the exception of the #reset event which is; a parser-generated event, used as a means to reset all states and resync the machine.

FIG. 14 is a table of the different states of the object-oriented state machine 80 and concomitantly parser 68 (FIGS. 4 and 5), indicating the various transitions among the different states. This table sets forth the relationships among all states of the state machine 80 and substantially all possible TL-1 response events. Each state of the object oriented state machine 80 of parser 68 is assigned to a respective column of the table, while each event is assigned to a respective row. The different cells of the table indicate the state processes which result from sending the messages (or events) of the various rows to a current state object 82 having the states of the different columns. These processes include the following:

saveHeader—Extract fields from Header and save in response block object 86 (FIGS. 5, 10, 11).

noop—Do nothing.

saveCommand—Extract raw data and save in buffer of response block object 86 (see FIG. 11)

saveCtag—Extract ctag and save in ctag buffer (FIG. 11) of response block object 86; check a hold buffer of response object 86; if empty, make data state object 154 the current state object; if not empty, add raw event data to an errorData buffer (FIG. 11) of response block object 86 but do not calculate CRC and then make error comment state object 148 the current state object.

save Error—Copy raw data to an errorData buffer of response block object 86.

saveData—Copy raw data to a data buffer (FIG. 11) of response block object 86.

saveComment—Copy raw data to a comment buffer of response block object 86.

saveCRC—Extract CRC trom comment and save in a hold buffer of Response block object 86.

reset—Clear hold buffer event to nil.

HoldEvent—Put current event in a hold buffer of the response block object 86; calculate CRC using raw data.

The holdEvent is a special variable used to control the state machine 80 when error data and error comments are split into different data blocks from the Litespan™ telecommunications network. This variable is used because there is no way to distinguish a data string from an error data string or an error comment string from a comment string. The holdEvent variable is used to tell the state machine to resume operation with the current state object 82 being the error data object 150 or the error comment object 148. The error data would be carried to the next response block object but would not be calculated into the crcCalculated variable, To start state machine 80, the TL1ResponseBlock class object 87 invokes the state object TL1State create. This creates an instance of the TL1PromptSync state 164. TL1ResponseBlock class object 87 holds references to this state and a reference to the response block object 86. TL1ResponseEvent class object 88 starts reading a line of TL-1 data from the data stream and creates an instance of itself, i.e., response event object 89, to translate the TL-1 data into an event. The particular TL-1 response event block object 89 is then passed into the state machine process with the response block object 86. At this point a loop is established till all the TL-1 data has been parsed. The consumer verifies CRC upon completion and detects and corrects any out-of-sync operation.

Handling of Autonomous Reports

The state diagram of FIG. 13 depicts what happens in the object-oriented state machine 80 upon the reception of an autonomous report or notification from the telecommunications network. The current state object, which may generally be any state indicated in FIGS. 10, 12, 13, or 14, replaces itself with a new state object 166 called the TL1AutonomousReportState object. In addition, when an autonomous report or notification is received by parser 68, consumer 84 generates another response block object 168 (FIG. 5) for holding report data and inserts a pointer in the original response block object 86 to the new response block object 168. The pointer identifies the second response block object 168 and prevents the closure or delivery of the original response block object 86 to its client application (usually the graphical user interface 64) until the completion, closure or population of the second response block object 168.

When the current state object of the parser 68 is TL1AutonomousReport object 166, the expected event is a line containing a code describing the type of autonomous report. This line of code is identified, for example, by the initial character "A" or by the string "REPT" or the string "CANC" and is identified in the drawings as "autonomousMsg." The arrival of this line of code causes a transition to another state 170, called the TL1AutonomousReportDataState. In this state 170, the state machine 80 of parser 68 expects data pertaining to the autonomous report or notification. The arrival or a termination message (";"), indicating that the entire autonomous report or notification has been received, causes a state transition to the final state 160. Subsequently, the state of machine 80 reverts to the state which existed when the autonomous report arrived. This identity of this prior state is preserved as a reference in TL1ResponseBlock object 86. A completion report is generated to let the parser 68 know that the entire data block of the autonomous report has been received. This completion report, together with the data received, is stored in response block object 168 (see FIGS. 5 and 10).

It is possible for more than one autonomous report to arrinve prior to the reception of the last data block for the TL1 request that generated the original response block object 86. In this case, other response block objects 172 are generated and processed as discussed above. Earlier generated response block objects have pointers which identify subsequently generated response block objects and thereby establish a hierarchical tree structure. In accordance with the tree structure, earlier response block objects await the completion, closure or population of subsequent response block objects. Only after all response block: object have been filled or completed will all the response block objects be delivered to their respective clients or targets.

Other states may be added to the state diagram of FIG. 13, if necessary for parsing, e.g., for error handling, etc. In fact, an advantage of using an object-oriented state machine for parsing a TL-1 data stream is the ease at which additional states may be added. Such additional states may be necessary, for example, if the language of the telephony system changes.

A new state machine is invoked and a new response object is created each time a new autonomous report arrives over data link 74 from the network. Generally, each autonomous report which arrives during the reception of a TL-1 response is parsed before the parsing of the TL-1 response is completed. Should a first autonomous report comprise multiple data blocks and a second autonomous report arrive before the last of the data blocks of the first autonomous report, then another autonomous report response block object will be created and another state machine invoked per FIG. 13. A pointer is inserted in the first autonomous report response block object which points to or identifies the second autonomous report response block object. The first autonomous report response block object will not be directed to its intended recipient until a completion message is sent indicating that the second autonomous report response block object is completely populated.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A craft interface device for maintaining and provisioning operations in a telecommunications network, comprising:

a graphical user interface operatively connected to a monitor for displaying thereon structural components of the telecommunications network and lor indicating, on said monitor, operating relationships among said structural components;

a port object located in memory and responsive to messages for writing characters for transmission over a data link of said network and for reading characters arriving from said network;

a domain modeling framework operatively connected to said graphical user interface for supplying thereto descriptions of said structural components and operating relationships to be displayed; and a communications framework operatively connected to the domain modeling framework for generating and transmitting, in response to user commands detected by the graphical user interface, data requests over said data link and for reading data lines arriving from the network, said communications framework including a parser having an object-oriented state machine operatively coupled to the communications framework for parsing information from an incoming sequence of data lines or events, said parser being operatively connected, via said domain modeling framework, to said graphical user interface for providing information thereto for display, said state machine including a current state object taken from a group of different possible state objects each transformable into at least one of the other state objects in response to an incoming message of a given type.

2. The craft interface device defined in claim 1 wherein said parser also includes a lexer which generates symbols in response to said data lines or events, said current state object being operatively coupled to said lexer for (1) receiving therefrom a symbol corresponding to a respective one of said data lines or events, (2) thereupon replacing itself with a new state object representing a new current state of said parser and (3) extracting information from said respective one of said data lines or events.

3. The craft interface device defined in claim 2 wherein said parser further includes a response block object, said current state object being operatively coupled to said response block object for storing, in said response block object, information extracted from said one of said data lines or events.

4. The craft interface device defined in claim 3 wherein said response block object is a first response block object storing data responsive to a command generated by said framework and transmitted over said data link, said parser additionally including a second response block object storing data pertaining to an autonomous notification received by said port object from said network, said first response block including a pointer to said second response block preventing delivery of said first response block to said graphical user interface until said second response block is fully populated.

5. The craft interface device defined in claim 3 wherein said lexer includes a response event object which categorizes said incoming data lines or events and sends the information in the data lines or events to the state machine.

6. The craft interface device defined in claim 5 wherein said data lines or events are parts of a data block, said response event object holding a reference to said data block until all lines of said data block have been processed by said parser.

7. The craft interface device defined in claim 2 wherein said lexer retrieves said respective one of said data lines or events, categorizes the retrieved line, and sends information in the retrieved line to said current state object.

8. The craft interface device defined in claim 1 wherein at least some of said possible state objects are of different object classes.

9. An object-oriented method for obtaining, from a telecommunications network, information regarding structure and connections in said network, said method comprising:
   transmitting a request for information onto the telecommunications network;
   generating a response block object for retaining information received from said network in response to the transmitted request;
   parsing said information from an incoming sequence of data lines or events, the parsing including:
      retrieving a line or event of an incoming data block;
      having a response event object categorize the retrieved line or event;
      passing a message containing information from the retrieved and categorized line or event to a current state object representing a current parser state, said current state object having one of a plurality of different possible states each replaceable by one of the other states in response to an incoming message of a given type;
      in response to the passing of said message to said current state object, replacing said current state object with a new state object determined in part by the state of the current state object and in part by the type of said message, said new state object representing a new current parser state; and
      also in response to the passing of said message to said current state object, storing, in said response block object, information extracted from said retrieved and categorized line or event.

10. The method defined in claim 9 wherein the state of said new state object is different that the state of the said current state object.

11. The method defined in claim 9 wherein said response block object is a first response block object storing data responsive to said request, fuirther comprising:
   receiving an autonomous notification or report from said network;
   in response to the reception of said autonomous notification or report, generating a second response block object;
   parsing said autonomous notification or report to derive autonomous data;
   storing said autonomous data in said second response block object;
   inserting, in said first response block object, a pointer to said second response block; and
   in response to said pointer, preventing closure or delivery of said first response block until said second response block is fully populated.

12. The method defined in claim 9 wherein said data lines or events are parts of a data block, fiirther comprising holding a reference to said data block until all lines of said data block have been parsed.

13. The method defined in claim 9 wherein at least some of said possible state objects are of different object classes.

14. The method defined in claim 9 wherein the transmitting of said request onto said network includes generating said request in response to a user command detected by a graphical user interface.

15. In a craft interface device for maintaining and provisioning operations in a telecommunications network, a method for parsing data, comprising:
   providing a response block object for receiving and temporarily storing parsed data;
   providing an object-oriented state machine having a current state object of a given class;
   receiving a line of data of an incoming telecommunications data block from the telecommunications network;
   generating a symbol corresponding to a category of said line of data;
   passing said symbol to said current state object;
   upon passing of said symbol to said current state object, replacing said current state object with a new state object of a different class depending in part on said given class and on the type of said message; and
   also upon feeding of said symbol to said current state object, saving information from said line of data in said response block object.

16. The method defined in claim 15, further comprising trarnsmitting, onto said network, a request for information pertaining to structural components and operative connections of said network, said incoming telecommunications data block being responsive to said request, the providing of said response block object including generating said response block object in response to said request.

17. The method defined in claim 16 wherein said response block object is a first response block object, further comprising:
   receiving an autonomous notification or report over said network prior to receiving a final line of data in response to said request;
   in response to receipt of said autonomous notification or report, generating a second response block object for retaining data of said autonomous notification or report;
   inserting, in said first response block object, a pointer identifying said second response block object;
   populating said second response block object with data from said autonomous report or notification; and
   closing or delivering said first response block object only after completion of population of said second response block object.

18. The method defined in claim 15 wherein the converting of said line of data into said message includes generating a response event object and populating said response event object with data from said line of data.

19. The method defined in claim 15 wherein said given class is one of a plurality of different object classes.

* * * * *